United States Patent [19]
Haworth

[11] Patent Number: 6,018,312
[45] Date of Patent: Jan. 25, 2000

[54] LOCATING THE SOURCE OF AN UNKNOWN SIGNAL

[75] Inventor: David Patrick Haworth, Defford, United Kingdom

[73] Assignee: The Secretary of State for Defence in Her Britannic Majesty's Government of the United Kingdom of Great Britain and Northern Ireland, Hants, United Kingdom

[21] Appl. No.: 09/043,444
[22] PCT Filed: Sep. 20, 1995
[86] PCT No.: PCT/GB95/02211
  § 371 Date: Mar. 20, 1998
  § 102(e) Date: Mar. 20, 1998
[87] PCT Pub. No.: WO97/11383
  PCT Pub. Date: Mar. 27, 1997
[51] Int. Cl.[7] ............................... H04B 7/185; G01S 5/04
[52] U.S. Cl. ......................... 342/353; 342/444; 342/453; 342/465
[58] Field of Search ............................ 342/444, 450, 342/353, 357.01, 378, 453, 465

[56] References Cited

U.S. PATENT DOCUMENTS

| | | |
|---|---|---|
| 4,799,062 | 1/1989 | Sanderford, Jr. et al. . |
| 5,008,679 | 4/1991 | Efland et al. . |
| 5,317,323 | 5/1994 | Kennedy et al. . |
| 5,570,099 | 10/1996 | DesJardins ............................... 342/378 |
| 5,594,452 | 1/1997 | Webber et al. ........................... 342/353 |

OTHER PUBLICATIONS

IEEE Transactions on Aerospace and Electronic Systems, vol. 29, No. 4, Oct. 1, 1993, pp. 1228–1235, XP000413502 Sonnenschein A et al: "Geolocation of Frequency–Hopping Transmitters Via Satellite" see p. 1228, right–hand column, line 1–p. 1229, left–hand column, line 12; figure 1.

Primary Examiner—Gregory C. Issing
Attorney, Agent, or Firm—Nixon & Vanderhye P.C.

[57] ABSTRACT

A method of determining the location of an unknown source (10) transmitting an unknown signal to satellite relays (14 and 16) comprises receiving the signal from the relays at respective receivers (18). The receivers (18) receive reference signals via respective relays from a common source (22). The unknown signal and reference signal received by each receiver (18) are processed coherently to preserve their timing and phase information relative to one another independently of signals received elsewhere. The signals are frequency downconverted and digitised, and transferred to a common processing computer (150). The computer (150) performs cross ambiguity function processing of the reference signals to determine their relative Differential Time Offset (DTO) and Differential Frequency Offset (DFO). It performs the like for the received unknown signals to determine relative DTO and DFO, relative time and frequency shifts being introduced between the unknown signals by incorporation of the reference signal DTO and DFO in order to enable the unknown signal DFO to be determined relative to the reference signal DFO. The reference signals are also employed to counteract phase noise and frequency drift effects in the unknown signals. From the unknown signal DTO and DFO the position of the unknown source (10) is calculated.

28 Claims, 8 Drawing Sheets

LOCATING THE SOURCE OF AN UNKNOWN SIGNAL

BACKGROUND OF THE INVENTION

1. Field of the Invention

This invention relates to a method and apparatus for locating the source of an unknown signal received by a plurality of signal relays.

2. Discussion of the Invention

Prior art location systems are known which employ a technique based on determination of the time difference of arrival (TDOA) of two signals from the source to be located, ie an unknown transmitter. In this technique, a signal from the transmitter is relayed to a ground-based receiving station along two independent signal paths by a respective earth-orbiting satellite in each path. Each satellite incorporates a transponder system which accepts a signal (uplink) from a ground transmitter at one frequency and returns a frequency-shifted (downlink) signal to a ground receiver with the aid of a turnround oscillator. The signal paths are of unequal length, because the two satellites are in different positions. In consequence, the signal arrival time at the receiving station associated with one path is different to that associated with the other. The positions of the two satellites and the receiving station are known, and consequently the time difference of arrival—the TDOA—of the signal over the two different paths provides information on the location of the unknown transmitter.

For specific satellite positions, the locus of points of constant TDOA defines a curve on the earth referred to as a line of position (LOP). An unknown ground-based transmitter giving rise to a specific value of TDOA is located at some point on the LOP associated with that value. The geometrical relationship between the satellites together with signal propagation delay in satellite transponders and receiving station equipment, must be known in order to determine the correct value of TDOA.

However, an LOP only locates an unknown transmitter to an arbitrary position on a curve. U.S. Pat. No 5,008,679 discloses a transmitter location system incorporating two relay satellites as previously mentioned, the system employing both the TDOA of signals from an unknown transmitter and what is referred to as their frequency difference of arrival (FDOA). FDOA occurs because the relay satellites are in motion relative to the earth and to one another, and in each case the motion introduces a Doppler shift into the downlink signal frequency. The two satellites' Doppler shifts differ, and this produces a frequency difference or EDOA between signals arriving at the receiving station from respective satellites. As in the TDOA approach, an FDOA measurement defines a line of position (LOP) upon which the unknown transmitter lies. The TDOA and FDOA lines of position generally differ, and their intersection provides the location of the unknown transmitter.

However, the system of U.S. Pat. No. 5,008,679 is subject to a number of constraints. It requires the positions and velocities of the satellites to be known with a high degree of accuracy. It cannot be used effectively with communications signals of 50 kHz bandwidth or less if the satellites have orbital inclinations of more than 0.1 degree relative to the Earth's equatorial plane. The system also requires a very high degree of phase stability from the ground station local oscillators and the satellite signal turnround oscillators. The latter requirement may render the system ineffective with satellites having very low inclination angles, ie less than 0.01 degree; this is because the Doppler shift caused by satellite motion is small and difficult to measure at such inclinations.

Furthermore the system of U.S. Pat. No. 5,008,679 can only be used with collocated receiving ground stations which have common time and frequency reference sources. It cannot be used without modification where the receiving ground stations are geographically separate. The system also requires the use of phase-locked frequency downconversion chains.

SUMMARY OF THE INVENTION

It is an object of the invention to provide an alternative form of transmitter location system.

The present invention provides a method of locating the source of an unknown signal received by a plurality of signal relays, the method including the steps of:

(a) arranging for a plurality of receivers to receive the unknown signal from respective signal relays;

(b) arranging for the receivers to receive respective reference signals from respective signal relays, the reference signals either being replicas of a single signal or being replicas of signals locked in frequency, time and phase to a single signal and the reference signals being transmitted to the signal relays from reference transmitting means of known location;

(c) processing the respective unknown signal and reference signal received by each receiver coherently such that these signals preserve their timing and phase information relative to one another;

(d) performing cross ambiguity function processing of the processed reference signals and the processed unknown signals and employing the reference signals to counteract phase noise and frequency drift effects in the unknown signals in order to determine at least one of the following:

(i) values of the Differential Time Offset (DTO) and Differential Frequency Offset (DFO) of the unknown signals, (ii) values of the DTO of the unknown signals corresponding to different signal relay positions, (iii) values of the DFO of the unknown signals corresponding to different signal relay positions, (iv) values of the DTO of the unknown signals corresponding to different combinations of signal relays, (v) values of the DFO of the unknown signals corresponding to different combinations of signal relays, (e) calculating the position of the unknown signal source from the values of DTO and/or DFO as the case may be determined in Step(d).

The invention provides the advantage that it does not require the positions and velocities of the satellites to be known with the degree of accuracy required in the prior art, and it can be used with satellites which have an orbital inclination of up to at least 3 degrees. The invention does not require the degree of relay or receiver phase stability required in the prior art. It does not require receivers which are located geographically together, which have common time and frequency references and which employ phase-locked frequency downconversion using a common precision frequency standard. The invention is also able to perform location of an unknown signal source in the presence of other unwanted signals.

Processing in Step (c) of the invention is preferably carried out in respect of signals received by each receiver by downconverting the unknown signal and the reference signal to intermediate frequency (IF) signals with predetermined bandwidths and obtaining digital samples thereof with sample timing and frequency downconversion controlled in accordance with a precise frequency and timing standard. The unknown and reference signals are preferably arranged to have like IF bandwidths not greater than 4 MHz. For DTO determination the IF bandwidth is preferably set to be as close as possible to the bandwidth of the unknown signal, to which the reference signal bandwidth is also preferably matched. For precise DFO determination, the IF bandwidth is preferably lower than 100 kHz, eg as low as 10 kHz. This yields improved accuracy in DFO processing.

In a preferred embodiment, cross ambiguity function processing in Step (d) of the invention includes the step of producing complex data from real data by a Hilbert transform procedure. This makes it unnecessary to produce in-phase and quadrature unknown and reference signals for such processing.

Cross ambiguity function processing in Step (d) of the invention preferably also determines reference signal DTO and includes the steps of processing the reference signal as follows:

(a) finding a preliminary value of the reference signal DFO by evaluating the cross ambiguity function for a range of trial frequency offsets until a function maximum is obtained indicating that the relevant trial frequency offset is the required preliminary value;

(b) transforming first and second reference signals associated with respective receivers to frequency domain equivalents thereof;

(c) frequency shifting the first reference signal relative to the second reference signal in the frequency domain, the frequency shift consisting of the preliminary value of DFO;

(d) excising any unwanted frequency components in the frequency domain reference signals;

(e) in the frequency domain, multiplying the complex conjugate of each frequency component of the first reference signal by the corresponding frequency component of the second reference signal to produce frequency component products;

(f) transforming the frequency component products to the time domain and producing a respective value of the cross ambiguity function for each of a range of values of relative time offset between the first and second reference signals;

(g) selecting a set of the largest magnitude values of the cross ambiguity function, obtaining a maximum value of the magnitude of the cross ambiguity function by interpolation therebetween, and deriving the reference signal DTO as the relative time offset between the first and second reference signals which corresponds to that maximum value.

Measurement of the reference signal DTO by cross ambiguity function processing (as opposed to obtaining it by calculation) leads to improved accuracy of unknown source location.

Processing in Step (d) of the invention may include determining the reference signal DFO by a method including the steps of:

(a) determining the DTO between first and second reference signals associated with respective receivers;

(b) introducing a relative time shift between the first and second reference signals equal to the reference signal DTO;

(c) sampling the reference signals after the relative time shift;

(d) multiplying the complex conjugate of each first reference signal sample by a corresponding sample of the second reference signal to produce time component products;

(e) Fourier transforming the time component products to the frequency domain and producing a respective value of the cross ambiguity function for each of a range of values of relative frequency offset between the first and second reference signals;

(f) selecting a set of the largest magnitude values of the cross ambiguity function, obtaining a maximum value of the magnitude of the cross ambiguity function by interpolation therebetween, and deriving the reference signal DFO as the relative frequency offset between the first and second reference signals which corresponds to that maximum value.

Processing in Step (d) of the invention may include determining the unknown signal DTO by the steps of:

(a) introducing relative time and frequency shifts between first and second unknown signals associated with respective receivers, the time and frequency shifts being equal to the reference signal DTO and DFO respectively;

(b) sampling the unknown signals after the relative time and frequency shifts;

(c) transforming the first and second unknown signals to their frequency domain equivalents, (d) applying a trial frequency offset to the transformed second unknown signal;

(e) excising any unwanted frequency components in the transformed unknown signals;

(f) multiplying the complex conjugate of each frequency component of the first unknown signal by the corresponding frequency component of the second unknown signal to produce frequency component products;

(g) transforming the frequency component products to the time domain to produce a respective value of the cross ambiguity function for each of a range of values of relative time offset between the first and second unknown signals;

(h) repeating steps (d) to (g) for a range of trial frequency offsets to obtain values of the cross ambiguity function;

(i) selecting a set of the largest magnitude values of the cross ambiguity function, obtaining a maximum value of the cross ambiguity function by interpolation therebetween, and deriving the unknown signal DTO as the relative time offset between the first and second unknown signals which corresponds to that maximum value.

Processing in Step (d) of the invention may include determining the unknown signal DFO and may include a stage comprising processing reference signals and incorporating the steps of:

(a) introducing relative time and frequency shifts between first and second reference signals associated with respective receivers, the shifts being equal to the reference signal DTO and DFO respectively;

(b) sampling the reference signals after the relative time and frequency shifts;

(c) multiplying the complex conjugate of each first reference signal sample by the corresponding sample of the second reference signal to produce time component products;

(d) Fourier transforming the time component products to the frequency domain to produce a respective value of the cross ambiguity function for each range of values of relative frequency offset between the first and second reference signals;

(e) excising unwanted frequency domain components from the cross ambiguity function;

(f) Fourier transforming the excised cross ambiguity function back to the time domain to produce a set of filtered time domain products between the first and second reference signals containing phase noise perturbation information.

Processing in Step (d) of the invention may include determining the unknown signal DFO and may include a further stage comprising processing the unknown signal and incorporating the steps of:

(a) introducing relative time and frequency shifts between first and second unknown signals associated with respective receivers equal to the reference signal DTO and DFO respectively;

(b) sampling the unknown signals after the relative time and frequency shifts;

(c) multiplying the complex conjugate of each first unknown signal sample by the corresponding sample of the second unknown signal to produce time component products;

(d) multiplying each time component product by the complex conjugate of the filtered time component product of the first and second reference signals;

(e) Fourier transforming the time component products to the frequency domain and producing a respective value of the cross ambiguity function for each of a range of values of relative frequency offset between the first and second unknown signals;

(f) selecting a set of the largest magnitude values of the cross ambiguity function, obtaining a maximum value of the cross ambiguity function by interpolation therebetween, and deriving the unknown signal DFO relative to the reference signal DFO as the relative frequency offset between the first and second unknown signals which corresponds to that maximum value.

The position of the unknown source is preferably calculated by a method based on:

(a) obtaining from the unknown signal DTO relative to the reference signal DTO an expression involving the differential slant ranges (DSRs) of the reference transmitter and the unknown source, DSR being the difference between path lengths from the transmitter or source to the signal relays;

(b) obtaining from the unknown signal DFO relative to the reference signal DFO an expression involving the differential slant range rates (DSRR) of the reference transmitter, unknown transmitter and receiver paths, the DSRR in each case being the rate of change with time of the respective DSR; and (c) performing a Taylor expansion analysis of the DSR and DSRR expressions to derive the location of the unknown source from the difference between the unknown and reference DTOs and DFOs, the positions and velocities of the relays and the locations of the reference transmitter and the receivers.

The location derived for the unknown source in Step (c) may be a first value thereof, and one or more improved values thereof may be derived by back substitution of the first value in the Taylor expansion analysis and iteration of the derivation of the location of the unknown source until convergence is obtained.

The derivation of the location of the unknown source may be refined by the steps of:

(a) producing calculated values of the unknown signal DSR and DSRR from a derived value of the location of the unknown source, the positions and velocities of the relays and the locations of the receivers;

(b) producing a correction for the derived location of the unknown source from the differences between the calculated values of the unknown signal DSR and DSRR relative to the reference signal and those measured with the aid of cross ambiguity function processing.

To a first order, the differences between the calculated and measured values of the unknown signal DSR and DSRR are related to the longitude and latitude errors in the position of the unknown source by two linear equations. The longitude and latitude errors are preferably determined by solving these equations.

The reference signal may be a communications signal obtainable from the signal relays, or alternatively it may be obtained from transmitters producing signals in phase coherence with one another, the transmitters being directed to respective signal relays.

The processed reference signals and processed unknown signals are preferably stored prior to cross ambiguity function processing.

In an alternative aspect, the present invention provides an apparatus for locating the source of an unknown signal received by a plurality of signal relays, the apparatus including:

(a) a plurality of receivers to receive the unknown signal and respective reference signals from respective signal relays; the reference signals either being replicas of a single signal or being replicas of signals locked in frequency, time and phase to a single signal and the reference signals being transmitted to the signal relays from reference transmitting means of known location;

(b) means for processing the respective unknown signal and reference signal received by each receiver coherently such that these signals preserve their timing and phase information relative to one another;

(c) means for:

(i) performing cross ambiguity function processing of the processed reference signals and the processed unknown signals and employing the reference signals to counteract phase noise and frequency drift effects in the unknown signals in order to determine at least one of the following:

(1) values of the Differential Time Offset (DTO) and Differential Frequency Offset (DFO) of the unknown signals, (2) values of the DTO of the unknown signals corresponding to different signal relay positions, (3) values of the DFO of the unknown signals corresponding to different signal relay positions, (4) values of the DTO of the unknown signals corresponding to different combinations of signal relays, and (5) values of the DFO of the unknown signals corresponding to different combinations of signal relays, and (ii) calculating the position of the unknown signal source from the values of DTO and/or DFO as the case may be determined in cross ambiguity function processing.

The apparatus of the invention may be arranged to offset received signals in time and/or frequency as appropriate in accordance with values obtained for DTO and/or DFO as the case may be and to obtain further values thereof from such offset signals. It may include reference signal transmitting means arranged to transmit to the signal relays reference signals of substantially equal intensity, and these signals may incorporate modulated and unmodulated carrier wave components. It may also include means for storing the processed reference signals and processed unknown signals prior to cross ambiguity function processing.

BRIEF DESCRIPTION OF THE INVENTION

In order that the invention might be more fully understood, embodiments thereof will now be described, by way of example only, with reference to the accompanying drawings, in which.

DETAILED DISCUSSION OF THE PREFERRED EMBODIMENTS

Figure 1:
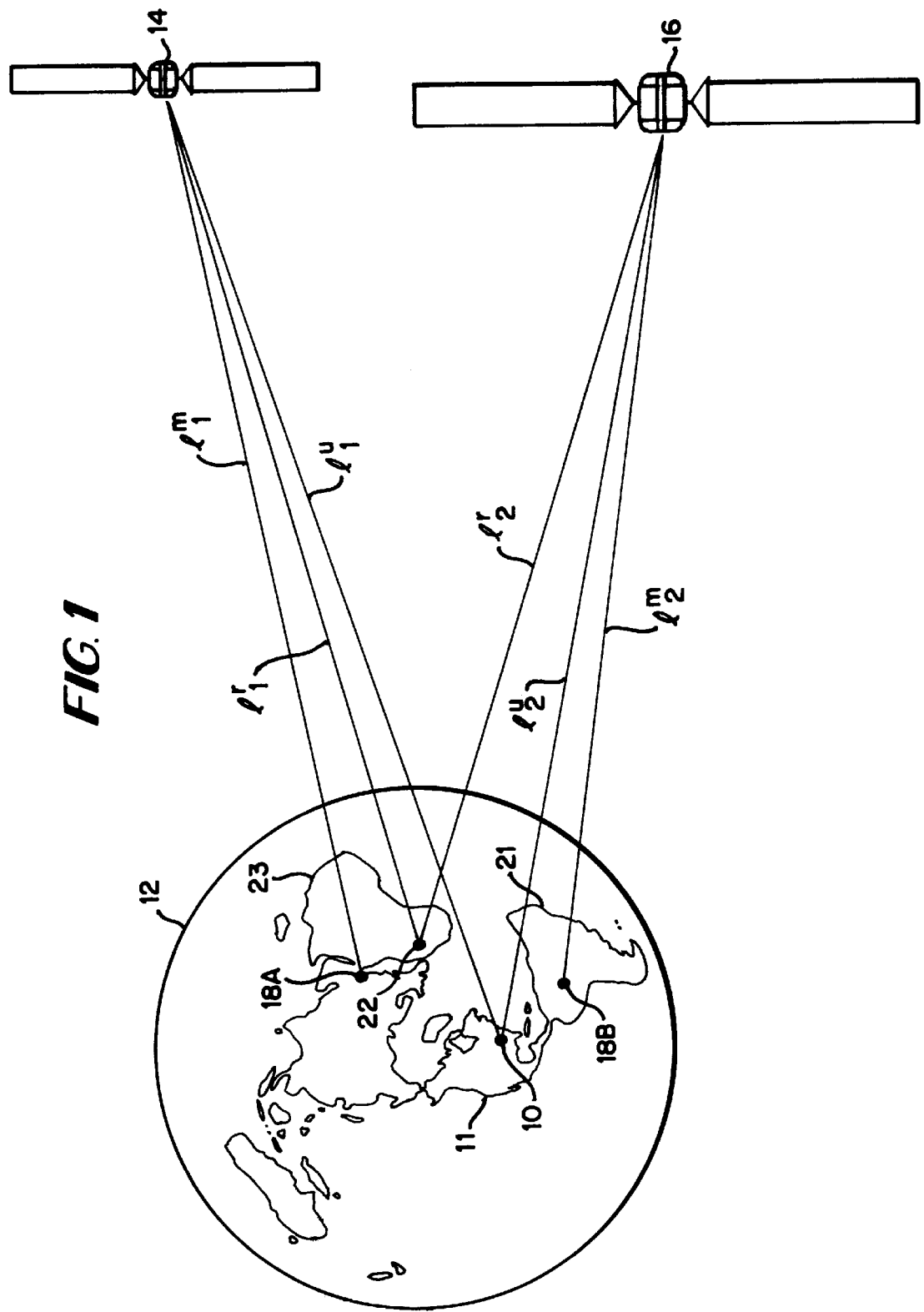
FIG. 1 illustrates signal propagation between Earth-based transmitters, satellite relays and Earth-based receivers.

Referring to FIG. 1, an unknown transmitter 10 located in the United States of America 11 is shown on the surface of the Earth 12, the northern hemisphere of which is illustrated with the North Pole (not shown) located centrally. The unknown transmitter 10 has a main radiation intensity lobe (not shown) directed to a first satellite 14 in a geosynchronous orbit. It transmits a signal which propagates to that satellite along a first uplink path $l_1^u$ and produces interference with unknown signals using the satellite. The unknown signal frequency is determined by spectrum analysis equipment which routinely monitors the unknown channels of the satellite. A typical communications satellite operating at Ku band (11–14 GHz) has 16 channels each 36 Mhz wide and each capable of carrying 100 communications signals. The transmitter 10 also has a radiative sidelobe (not shown) directed to a second satellite 16 in a geosynchronous orbit, to which its signal propagates along a second uplink path $l_2^u$. The superscript "u" to path references $l_1^u$ and $l_2^u$ denotes that they originate at the unknown transmitter 10. The first satellite 14 receives the signal from the unknown transmitter 10 and retransmits it along a first downlink path $l_1^m$ to a first Earth-based ground station or receiver 18A directed at that satellite and located in Israel. The second satellite 16 also receives the unknown transmitter signal and retransmits it along a second downlink path $l_2^m$ to a second Earth-based receiver 18B located in South America 21. Here the superscript "m" denotes a path to an Earth-based receiver monitoring a satellite. The Earth-based receivers 18A and 18B will be referred to by the reference 18 to indicated either or both without differentiation, and as 18A or 18B as appropriate when being specific. A similar convention will be adopted for other elements with suffixes A and B to be described later.

The total signal propagation path length from the transmitter 10 to the first receiver 18A is equal to the sum of the lengths of the paths $l_1^u$ and $l_1^m$, and that from the transmitter 10 to the second receiver 18B is equal to the sum of the lengths of the paths $l_2^u$ and $l_2^m$.

A reference transmitter 22 at a known geographical position in Africa 23 transmits a reference signal along third and fourth uplink paths $l_1^r$ and $l_2^r$ to the first and second satellites 14 and 16 respectively; here the superscript "r" denotes transmission from the reference transmitter 22. The reference transmitter 22 is selected from those using the communications channel associated with one of the satellites 14 and 16. The satellites 14 and 16 retransmit the reference signal to the receivers 18 along the downlink paths $l_1^m$ and $l_2^m$ respectively.

Figure 2:
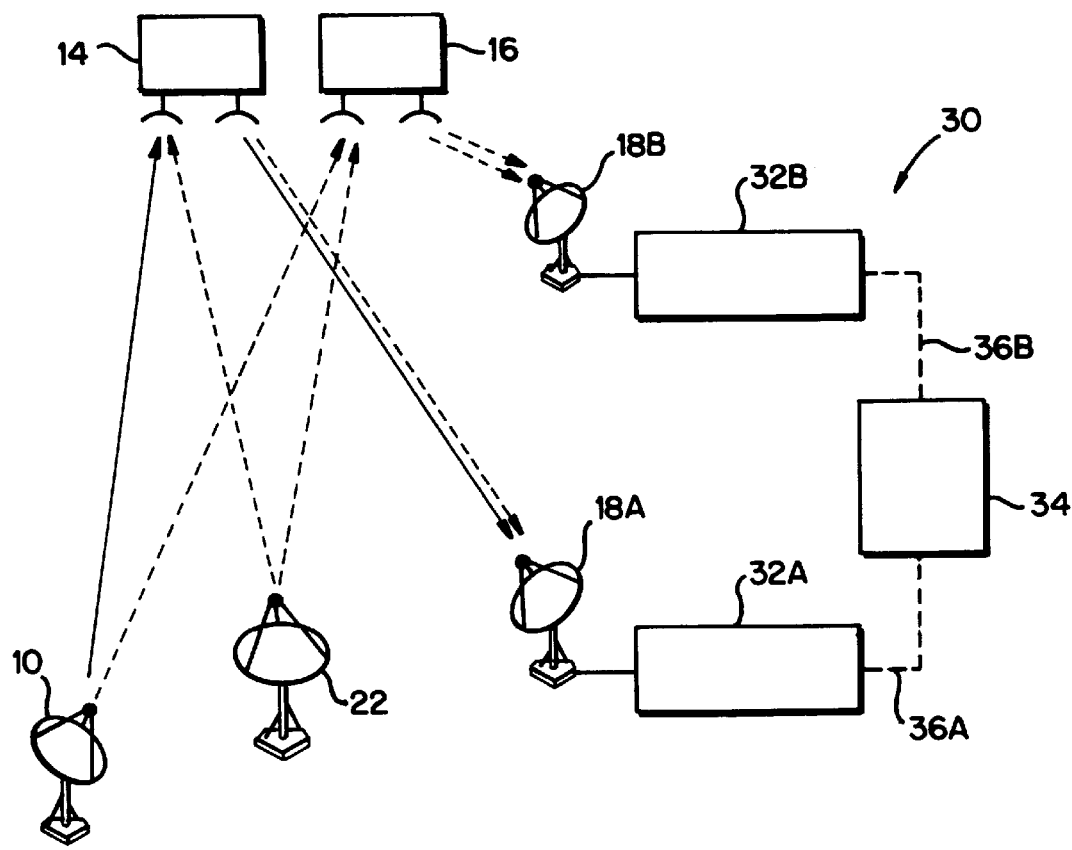
FIG. 2 is a schematic diagram of a transmitter location system of the invention together with associated Earth-based transmitters and satellite relays.

Referring now also to FIG. 2, a transmitter location system of the invention is shown in schematic form and is indicated generally by 30. The unknown transmitter 10, reference transmitter 22 and receivers 18 are indicated by antenna symbols. The satellites 14 and 16 are indicated by rectangles. The receivers 18A and 18B are connected respectively to first and second acquisition systems 32A and 32B, each of which processes the unknown and reference signals in separate channels to be described in more detail later. The acquisition systems 32 are connected to a central control and processing computer (not shown) at a remote processing site 34 by respective modem data links 36A and 36B.

Figure 3:
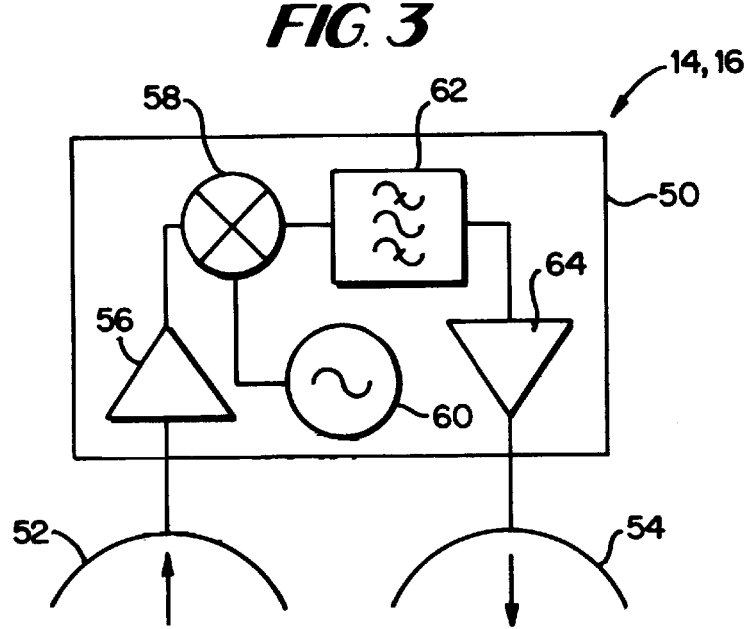
FIG. 3 shows in more detail the circuitry of a satellite relay.

The circuitry of the satellites 14 and 16 is shown in FIG. 3. Each comprises a container 50 on which is mounted a receive (uplink) antenna 52 and a transmit (downlink) antenna 54. The receive antenna 52 is connected to a low noise amplifier 56, which is in turn connected to a mixer 58 receiving a local oscillator input from a frequency turnround oscillator 60. The local oscillator frequency is 1.5 GHz for both satellites 14 and 16. The mixer 58 consequently produces a frequency downshift of 1.5 GHz. Output from the mixer 58 passes to a bandpass filter 62 and thereafter to a power amplifier 64 supplying a signal feed to the transmit antenna 54.

Figure 4:
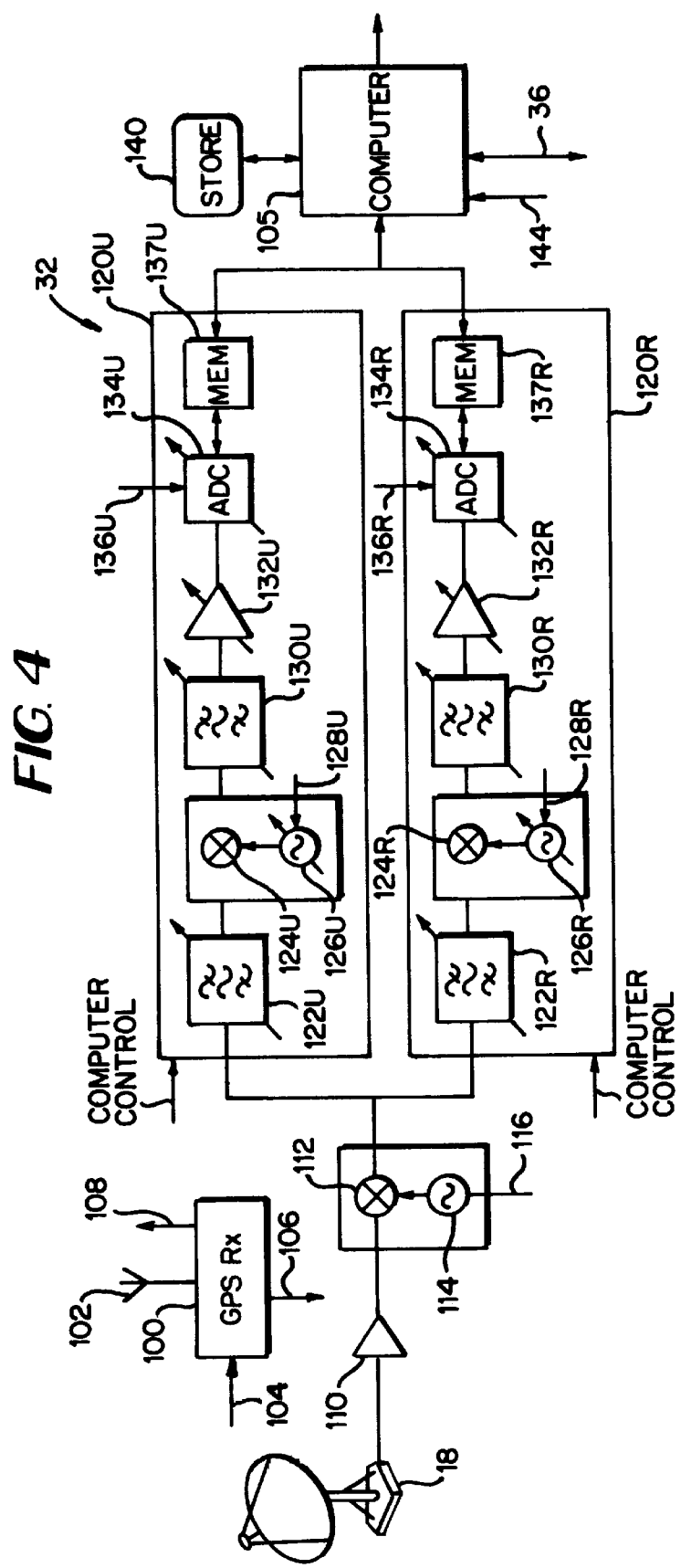
FIG. 4 shows in more detail the circuitry of the signal processing system associated with a receiver which is part of the transmitter location system of FIG. 2.

Referring now also to FIG. 4, the circuitry of each of the acquisition systems 32 is shown in more detail. Each acquisition system comprises a Global Positioning System (GPS) receiver 100 with an antenna 102 linking it to one or more GPS satellites (not shown) for supply of timing signals. The GPS consists of a number of satellites deployed in space and from which such signals are available. The GPS receiver 100 has a control input 104 together with outputs 106 and 108 for timing (t) and frequency (fr) signals respectively. The output 106 in fact represents two outputs each connected to a respective channel of the acquisition system 32 to be described later. There are two acquisition systems 32 each with two channels, and consequently there are four channels each of which may have a different start time T at which signal sampling is initiated. The timing and frequency signals associated with the two receivers 18A and 18B are very similar but not necessarily identical, and are respectively $t_A$ and $fr_A$, $t_B$ and $fr_B$. This is because the unknown and reference transmitters may be located so far apart on the surface of the Earth that they have access to differing parts of the GPS. In consequence, signals in the receiver 18A are not in phase coherence with signals in the receiver 18B, and it is an advantage of the invention that it does not require such coherence.

The control input 104 of the GPS receiver 100 is connected to a local host computer 105 which supplies control signals to it. The frequency signal fr is 5 MHz. The timing signal t controls signal sampling in the procedure of locating an unknown transmitter, as will be described in more detail later. Like the frequency signal fr, it is generated by the GPS receiver 100 from signals it receives from the GPS. To commence the procedure of locating an unknown transmitter, the computer 105 sends an instruction to the control input 104 indicating a start time; when the GPS indicates that this time has occurred the GPS receiver 100 initiates generation of the timing signal as a series of pulses in which adjacent pulses have a constant time difference Δt. The timing interval Δt is the same at both receivers 18A and 18B. The computer 105 obtains the time of any signal sample taken in response to the timing signal from $t_0+j\Delta t$, where $t_0$ is the start time and j is the sample number.

Output signals from the receiver 18 pass to a low noise amplifier 110 and thence to a mixer 112, which receives a local oscillator input signal from an oscillator 114. The oscillator 114 is connected at 116 to the GPS receiver output 108, and is phase locked to the frequency fr. Output signals from the mixer 112 pass to two channels 120U and 120R for the unknown and reference signals respectively. These channels have like components which are like referenced with suffixes U or R to indicate the relevant channel in each case. The channels and their components will be referred to without the U or R suffix to indicate either or both without differentiation, and with the relevant suffix when required to be specific.

In each channel 120, signals from the mixer 112 pass to a tunable pre-select filter 122 and thence to a mixer 124, which receives a local oscillator input signal at a frequency of 698.6 MHz from an oscillator 126. The oscillator 126 is connected at 128 to the output 108 of the GPS receiver, and is phase locked to the latter's frequency fr. The centre frequency and bandwidth of the pre-select filter 122 and the frequency of the oscillator 126 are tunable under control of the local host computer 105. The mixer output signals pass to a post-select filter 130 having a fixed centre frequency and tunable bandwidth under control of the local host computer and thence to a variable gain amplifier 132, from which in turn output signals pass to an analogue to digital converter (ADC) 134. The ADC 134 is a high speed, high stability, 8-bit device. It has a timing input 136 connected to the GPS receiver output 106, from which it receives the timing signal t. On receipt of each pulse of the timing signal, the ADC 134 produces a digitised sample of the output signal from the variable gain amplifier 132. The signal sampling rate is a minimum of twice the bandwidth of the output signal and under control of the local host computer. The ADC 134 is connected to a memory 137.

The memories 136U and 136R in the unknown and reference channels 120U and 120R respectively are both connected to the local host computer 105, which is in turn connected to an archive store 140, to the data link 36 as aforesaid, to the GPS receiver control input 104 by a connection 142, and to the GPS receiver output 106 by a connection 144.

Figure 5:
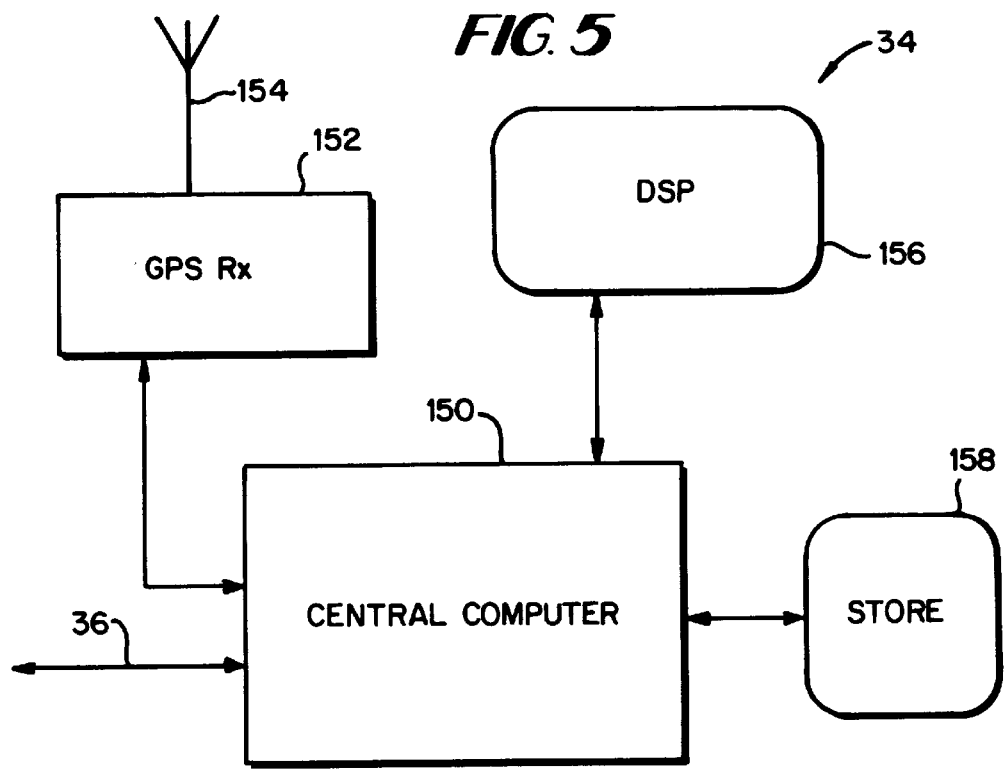
FIG. 5 illustrates computer processing apparatus incorporated in the transmitter location system of FIG. 2.

Referring now also to FIG. 5, elements of the remote processing site 34 are shown in more detail. The site 34 incorporates a central control and processing computer 150 connected to data links 36 and to a third GPS receiver 152 having an antenna 154 communicating with the GPS system. The computer 150 is also connected to a DSP unit 156 and an archive store 158.

The transmitter location system 30 operates as follows. The unknown transmitter 10 transmits a signal producing interference with signals in a communications channel of the first satellite 14. The unknown signal frequency is determined by spectrum analysis equipment monitoring the satellite communications channels. The unknown signal propagates to the satellites 14 and 16, where it is frequency downshifted by 1.5 GHz by the mixers 58 and retransmitted to the first and second receivers 18A and 18B respectively. A reference signal is then selected by human intervention. It is any signal which is present in a communications channel of the first satellite 14, which originates at a transmitter having a sidelobe directed at the second satellite 16, and which preferably has a similar bandwidth to that of the unknown signal as determined from monitoring the satellite 14 downlink. It has a frequency differing from that of the unknown signal sufficiently to enable these signals to be separated into different channels after frequency downconversion at the mixer 112. By way of example, a typical unknown signal is transmitted with a centre frequency of 14.005 GHz and comprises a 128 kb/s data signal. This signal is downshifted in frequency to 12.505 GHz by the satellite turnround oscillator 60. An adjacent signal is selected as a reference by monitoring the satellite 14 downlink spectrum, such as a 256 kb/s data signal identified in the channel some 10 MHz higher in frequency than the unknown signal. Such a reference signal would have a frequency of 12.515 GHz corresponding to a transmitter frequency of 14.015 GHz. The reference signal is relayed by the satellites 14 and 16 to respective receivers 18.

The signal-to-noise ratio at the first satellite 14, which is the target satellite for the main lobe of the unknown transmitter 10, is likely to be significantly greater than unity, and has typical values of 5 to 15 dB. However, the second satellite 16 is likely to be associated with signals having a very low signal-to-noise ratio, because it only receives low power signals from the a sidelobe of the unknown transmitter 10. Such low signal levels are not detectable by conventional means, and it is necessary to use a signal correlation technique to be described later.

After reception at the receivers 18, the unknown and reference signals are amplified at 110 and mixed at 112 with a local oscillator frequency of 11.805 GHz. The local oscillator frequency is tuned by the respective local host computers so that the difference between each of them and the relevant unknown or reference frequency is close to a predetermined intermediate frequency (IF) of 700 MHz. Mixing in the mixers 112 then converts the unknown and reference signals to IF signals which pass to respective pre-select filters 122U and 122R. The pre-select filters 122 have bandwidths tunable by means of the local host computer. For an initial set of signal data, the unknown channel pre-select filter 122U is tuned to have a passband centred on the unknown signal IF. The unknown channel post-select filter 130U sets the bandwidth of the downconverted signal. A wide bandwidth reduces errors in measuring time up to a point where other errors become more important, and this sets the 4 MHz limit. The reference filter 122R is tuned to have a passband centred on the reference signal IF. The unknown and reference channel filters 122 have passbands and frequency selectivity appropriate for the unknown channel filter 122U to reject the reference signal and the reference channel filter 122R to reject the unknown signal. After filtering, the unknown and reference IF signals are downconverted in mixers 124 to a lower intermediate frequency (LIF). The frequencies of the local oscillators 126 are accurately phase locked to the GPS signal so that the phase and frequency of the unknown signal relative to the reference signal is preserved in the respective acquisition system 32. These frequencies are set under control of the local host computer 105, so that a fixed LIF passes to the post-select filters 130, where the signals are subsequently filtered once more to define the final filtered bandwidth, which, as for the unknown signal can be up to 4 Mhz. After this the LIF signals are adjusted in amplitude by setting the gain of the amplifiers 132 appropriately in order to utilise the full dynamic range of the ADCs 134 (8 bits).

Signal sampling by the ADCs 134 is initiated as follows. The central computer 150 indicates a start time to each of the local host computers 105, which relay it to respective GPS receivers 100. When the GPS indicates that the start time has occurred, each GPS receiver 100 initiates the timing signal t. As the location of the reference signal is known, the propagation delay via the two satellite paths is calculated and the acquisition start time offset between sites to take account of the different propagation delays. Acquisition is implemented to a timing accuracy of 0.001 second. As has been said, the timing signal t consists of a train of timing pulses at successive constant sampling time intervals $\Delta t$ of 1.953125 $\mu$sec. The pulses are accurately phase locked to the GPS frequency fr, and therefore also to the frequencies of the local oscillators 114 and 126 in the relevant acquisition system 32. Each ADC 134 produces a digital signal sample of the unknown or reference signal (according to channel) in response to each timing signal. Each memory 136 temporarily stores the respective digital signal samples together with the associated start time. Each local computer 105 subsequently reads out the data comprising the respective samples and start time of sampling from the memories 136U and 136R associated with it, and stores them in its archive store 140. In an individual determination of an unknown transmitter's position, a total of $16.384 \times 10^6$ samples are taken by each of the four ADCs 134UA, 134RA, 134UB and 134RB before the timing signal is discontinued.

The time that any digital signal sample is taken is obtainable from $t_0 + j\Delta t$, where $t_0$ is the start time and j is the sample number. There may be up to four different start times as has been said, one per ADC 134 and given by $t_{0UA}$, $t_{0RA}$, $t_{0UB}$ and $t_{0RB}$ where time is defined relative to universal coordinated time (UTC). After sampling is complete, the archive stores 140A and 140B (associated respectively with the first and second receivers 18A and 18B) each contain samples and start times for both the unknown and reference transmitters 10 and 22. Moreover, at each individual receiver 18A or 18B, the unknown and reference signals are downconverted and sampled coherently because the mixers 112 and 124 and the ADCs 134 employ local oscillator and timing signals phase locked to the GPS frequency and time signal fr and t. However, fr, t and $t_0$ may not be exactly the same at receiver 18A as they are receiver 18B, because receiving sites may be located so far apart on the surface of the Earth that they have access only to differing parts of the GPS.

Storage of the digital signal samples and their timing in the archive stores 140A and 140B enables the location of the unknown transmitter to be obtained from the sampled data at any arbitrary time which might be convenient. The digital signal samples are transferred from the two receiver sites to the central control and processing computer 150 along the data links 36A and 36B for digital processing. The first processing operation carried out by the processing computer is to convert the digital samples from fixed (8 bit) precision numbers to floating point numbers. This reduces degradation in signal quality under subsequent processing. The second processing operation carried out by the processing computer 150 upon the digital signal samples is to convert them from real to complex form. This conversion employs the Hilbert Transform technique. To illustrate this, consider a purely real sine wave, which has a zero phase angle. Viewed in a two-dimensional plot of quadrature against in-phase component, the sine wave appears as a straight line parallel to the in-phase axis. In a three-dimensional plot where the axes are quadrature and in-phase components and time, the sine wave appears as a sine wave in the time/in-phase plane at the zero quadrature component position. After Hilbert transformation, the sine wave is converted to a rotating phasor. In a three-dimensional plot with axes of quadrature and in-phase components and time, the phasor appears as a circular helix axially parallel to the time axis. Since the phasor has both quadrature and in-phase components, it is demonstrated that Hilbert transformation converts a signal from real to complex form.

The processing operations to be carried out by the processing computer 150 will firstly be described in outline, and subsequently a mathematical treatment will be given. The processing computer 150 carries out Cross Ambiguity Function (CAF) processing of the signals from the unknown and reference transmitters to determine the Differential Time Offset (DTO) and Differential Frequency Offset (DFO) between these signals. The DTO and DFO are defined as follows:

DTO: the differential time offset, or the time delay between receipt of two replicas of an originally identical signal after reception via different routes.

DFO: the differential frequency offset, or the relative frequency shift between two replicas of an originally identical signal after reception via different routes.

From the DTO and relative DFO the position of the unknown transmitter relative to the reference transmitter can be determined in accordance with the invention.

In the theoretical discussion that follows, the expression "signals" is to be construed as meaning digital signal samples from the local host computers 105A and 105B after conversion to floating point form and Hilbert transformation in the processing computer 150.

The next processing operation to be carried out by the processing computer 150 is to perform Cross Ambiguity Function (CAF) processing of the reference signal to determine the DTO and coarse DFO between the reference signal's two replicas obtained via respective receivers 18A and 18B and acquisition systems 32A and 32B. CAF processing is described in a paper by S Stein titled "Algorithms for Ambiguity Functions Processing", IEEE Transactions ASSP-29 No 3, June 1981.

The cross ambiguity function or CAF $A(\tau, \upsilon)$ is defined by the following equation:

$$A(\tau, v) = \int_{-T/2}^{T/2} s_1^*(t) s_2(t + \tau) e^{-i2\pi vt} \, dt \tag{1}$$

where $s_1$ and $s_2$ are two analogue signals; $s_1^*$ represents the complex conjugate of $s_1$; $\tau$ and $\upsilon$ are respectively time and frequency offsets applied to $s_2$ relative to $s_1$. Equation (1) represents a correlation plus frequency shift operation. $A(\tau, \upsilon)$ is generally of complex form ie possessing both in-phase and quadrature components. The modulus of $A(\tau, \upsilon)$ is a maximum when $s_1(t)$ is identical to $s_2(t+\tau)e^{-i2\pi\upsilon t}$. In the case where $s_1$ and $s_2$ are replicas of the same signal after propagation from a common source, and during propagation one of these signals has become time delayed and frequency shifted relative to the other, the modulus of $A(\tau, \upsilon)$ is a maximum when the applied offsets $\tau$ and $\upsilon$ exactly counteract the time delay and frequency shift arising in the course of propagation. For signals received via relay satellites, time delay and frequency shift are due to differences between signal paths and motion of relay satellites, as well as differences in satellite turnround oscillators.

The processing computer 150 implements a digital equivalent of Equation (1) as will be described later. In the first instance it applies a series of trial frequency shifts to that reference signal replica received via the second receiver 18B relative to that received via the first receiver 18A. For each trial frequency offset υ the processing computer 150 applies a range of values of time offset τ and evaluates |A(τ, υ)| digitally. It searches the results of this procedure for an identifiable maximum value of |A(τ, υ)|, and the values of τ and υ to which this maximum corresponds are respectively equal to the DTO and DFO between the two replicas of the reference signal received by the receivers 18A and 18B. The value of DTO obtained by this procedure has acceptable accuracy for the purposes of the invention whereas that of DFO is a temporary approximation and is referred to as "coarse DFO".

Represented graphically, the correlation between the signals $s_1$ and $s_2$ as a function of varying time offset τ expressed as discrete values is a series of spikes over a few discrete time offsets, where the size of each spike represents the degree of correlation. However, the required time offset which maximises the degree of correlation generally lies between two applied time offsets. To determine the required time offset, the three largest correlations are taken and a parabolic curve is fitted to the logarithms of their magnitudes plotted as a function of τ. The interpolated time offset which corresponds to the peak of the parabola indicating the point of maximum correlation is taken as the required time offset and hence the required DTO.

In the next stage of processing, the computer 150 employs the unknown signal replicas received via the first and second receivers 18A and 18B. It applies a frequency offset equal to the reference coarse DFO to the unknown signal replica received via the second receiver 188B relative to that received via the first receiver 18A. The reason for this is that the reference and unknown DFOs will be similar because a major contribution to frequency shift arises from differences in satellite turnround oscillators and from motion of one satellite relative to the other, and the frequency shift from this is similar for both unknown and reference signals. In this connection, the turnround oscillators on adjacent satellites differ by typically 1 kHz, whereas the DFO of an unknown signal relative to a reference signal is typically less than 1 Hz. Using the unknown signal replicas, the processing computer 150 then repeats the CAF processing procedure previously used for reference signal replicas. The results of this procedure provide the DTO and coarse DFO between the two replicas of the unknown signal received by the receivers 18A and 188B. In this case the unknown coarse DFO is determined relative to the reference coarse DFO. The absolute value of the unknown coarse DFO is then determined by adding its relative value to the reference coarse DFO.

At this point a new set of reference and unknown signal data is obtained as previously described, except that all reference and unknown signals are filtered at 122 in a narrow bandwidth of 100 kHz, frequency offsets are applied as determined from the coarse DFO for the unknown and reference signals, and the start times are adjusted so that the four ADCs 134UA, 134RA, 134UB and 134RB have different start times $t_{0UA}$, $t_{0RA}$, $t_{0UB}$ and $t_{0RB}$.

The processing computer 150 instructs the local host computers 105A and 105B to apply an offset equal to the absolute value of the unknown signal coarse DFO to the frequency of the local oscillator 126UB in the unknown channel 120UB at the second receiver site 18B. This offset is relative to the frequency of the local oscillator 126UA in the unknown channel 120UA at the first receiver site 18A. Similarly, an offset equal to the reference coarse DFO is applied to the frequency of the local oscillator 126RB in the reference channel 120RB at the second receiver site. Here again the offset is relative to the frequency of the local oscillator 126RA in the reference channel 120RA at the first receiver site. The objective of this procedure is to correct for frequency offsets introduced by the motion of the satellites 14 and 16. The unknown channel post-select filters 130UA and 130UB are retuned to a bandwidth of 100 kHz by the local host computers 105A and 105B respectively in response to instructions from the processing computer 150.

The relationship between the start times is as follows:

$$t_{0UB} - t_{0UA} = \text{unknown signal DTO (uplink + downlink)}; \quad (2a)$$

$$t_{0RB} - t_{0RA} = \text{reference signal DTO (uplink + downlink)} \quad (2b)$$

Equations (2a) and (2b) show that the start times introduce offsets equal respectively to the unknown signal DTO and the reference signal DTO, each of which arise from a combination of uplink and downlink signal paths.

Signals received from the satellites 14 and 16 undergo frequency downconversion and digital signal sampling to provide the new set of reference and unknown signal data as previously described subject to the stated time and frequency offsets. The digital signals so produced undergo CAF processing in the computer 150 to generate a new and more accurate value of the DFO of the unknown signal relative to the reference signal. This value and those of DTOs obtained earlier are subsequently processed by the computer 150 (as will be described later) to yield the following quantities: the differential slant range (DSR), the differential slant range rate (DSRR) and change in each of DSR and DSRR, denoted by d-DSR and d-DSRR respectively. These are defined as follows:

DSR: the difference in length of the paths from a point on the ground to two satellites;

d-DSR: the overall change in DSR over a period of time;

DSRR: the rate of change of DSR with time;

d-DDSR: the overall change in DDSR over a period of time;

From the quantities DSR, d-DSR, DSRR and d-DDSR, the position of the unknown transmitter 10 relative to the known transmitter 22 is obtainable by calculation. A more detailed theoretical analysis of CAF processing and unknown transmitter location by the processing computer 150 using combinations of DSR and DSRR will now be given.

Referring to the use of the cross ambiguity function or CAF A(τ, υ) for determination of DTO, consider two signals $s_1$ and $s_2$ which are to undergo CAF processing in accordance with Equation 1. If $s_1$ and $s_2$ are time domain analogue signals $s_1(t)$ and $s_2(t)$, then after digital sampling at constant intervals $\Delta t$ they become $s_1(j\Delta t)$ and $s_2(j\Delta t)$, where j is the sample number. Because $\Delta t$ is a constant, j is the only variable and the expressions for the signals are equivalent to $s_1(j)$ and $s_2(j)$. Similarly, if $s_1(t)$ and $s_2(t)$ have frequency domain Fourier transforms $S_1(f)$ and $S_2(f)$, then the digital representations of the latter at discrete frequency intervals $\Delta f$ are respectively $S_1(k\Delta f)$ and $S_2(k\Delta f)$, equivalent to $S_1(k)$ and $S_2(k)$ where k is the frequency number; ie the sampled representations of the signal $s_1(t)$ and its Fourier transform $S_1(f)$ are:

$$s_1(t) = s_1(j\Delta t) \equiv s_1(j); S_1(f) = S_1(k\Delta f) \equiv S_1(k); \quad (3)$$

$$j = 0, 1, \ldots, N-1; k = 0, 1, \ldots, N-1, \text{ and } \Delta f \Delta t = \frac{1}{N}.$$

Similar expressions are obtained for $s_2(t)$ and $S_2(f)$ by changing the subscript indices 1 to 2 in Equation (3). The signals and transforms $s_1$, $s_2$, $S_1$ and $S_2$ are complex, ie they possess in-phase and quadrature components. The discrete time and frequency domain representations (eg $s_1$ and $S_1$) are linked by the Discrete Fourier Transform (DFT) and the inverse of this transform as:

$$S_1(k) = \frac{1}{N^{1/2}} \sum_{j=0}^{N-1} s_1(j) e^{-i2\pi jk/N} \quad (4)$$

$$s_1(j) = \frac{1}{N^{1/2}} \sum_{k=0}^{N-1} S_1(k) e^{i2\pi jk/N} \quad (5)$$

The DFT is implemented using a Fast Fourier Transform algorithm, as described, for example, in Cooley J W and Tukey J W, "An algorithm for the machine calculation of complex Fourier series", Math Computation, Vol 19, 1965, pp 297–301.

In general $s_2$ will have experienced a frequency shift relative to $s_1$. In order to compensate for this shift so that a good correlation is achievable between $s_1$ and $s_2$, a frequency offset $\delta f$ is applied to $s_2(j)$ to transform it to $s_2'(j)$ with consequential changes to the expression for its Fourier transform $S_2(k)$. $s_2'(j)$ is defined by the following Equations (6) to (8):

$$s_2'(j) = s_2(j) e^{-i2\pi j \delta f \Delta t} \quad (6)$$

$$S_2'(k) = \frac{1}{N^{1/2}} \sum_{j=0}^{N-1} s_2'(j) e^{-i2\pi jk/N} \quad (7)$$

$$S_2'(k) = \frac{1}{N^{1/2}} \sum_{j=0}^{N-1} s_2(j) e^{-i2\pi j(k+\delta k)/N} = S_2(k+\delta k) \quad (8)$$

In Equation (8), $\delta k$ is equal to $\delta f/\Delta f$.

Equations (6) to (8) show that $s_2$ has been frequency offset by $\Delta f$ with a corresponding shift of $S_2$ by $\delta k$. To speed computation during the search process, the coarse DFO is implemented by offsetting $S_2$ by units of the frequency step $\Delta f$ directly in the frequency domain thereby reducing the number of Fourier transforms that need to be computed.

When the Fourier transforms $S_1(k)$ and $S_2(k)$ are produced, the processing computer excises any frequency components therein which are noise corrupted or otherwise unwanted in subsequent processing.

As previously indicated, it is necessary to find an approximate DFO by using a series of trial frequency offsets and evaluating the CAF over a range of time offsets for each frequency offset; this is continued until a significant maximum in the CAF magnitude is obtained indicating that the relevant trial frequency offset is the required DFO. In the following processing, to simplify description, it will be assumed that this has been done; ie $s_2$ will be assumed to have been frequency offset by a value of $\delta f$ at least approximately equal to that which yields a maximum value of the CAF magnitude $|A(\tau, \upsilon)|$. In order to evaluate $A(\tau, \upsilon)$ for the purposes of obtaining a DTO value, the processing computer calculates the product of the two signals' Fourier transforms $S_1$ and $S_2$. This is shown in Equation (9):

$$S_1(k)^* S_2(k) = \frac{1}{N} \sum_{j=0}^{N-1} \sum_{j'=0}^{N-1} s_1^*(j) s_2(j') e^{-i2\pi(j'-j)k/N} \quad (9)$$

The inverse transform of Equation (9) is shown in Equations (10) and (11):

$$A(l_\tau) = \frac{1}{N^{1/2}} \sum_{k=0}^{N-1} S_1^*(k) S_2(k) e^{i2\pi l_\tau k/N} \quad (10)$$

Substituting for $S_1^*(k)$ and $S_2(k)$:

$$A(l_\tau) = \frac{1}{N^{3/2}} \sum_{k=0}^{N-1} \sum_{j'=0}^{N-1} \sum_{j=0}^{N-1} s_1^*(j) s_2(j') e^{i2\pi k(l_\tau - j' + j)/N} \quad (11)$$

where $l_\tau$ is a discrete number of time intervals $\Delta t$ applied by the processing computer 150 ie $\tau = l_\tau \Delta t$.

The summation with respect to k in Equation (11) can be carried out as a geometric series which does not involve s terms. Thus $$\sum_{k=0}^{N-1} e^{i2\pi k(l_\tau - j' + j)/N} = \frac{1 - e^{i2\pi(l_\tau - j' + j)}}{1 - e^{i2\pi(l_\tau - j' + j)/N}} \quad (12)$$

ie:-

$$\sum_{k=0}^{N-1} e^{i2\pi k(l_\tau - j' + j)/N} = N \text{ for } l_\tau = j' - j; = 0 \text{ otherwise} \quad (13)$$

Substituting N into Equation (11), and recalling that the summations over j and j' reduce to a summation on j since only j'=j+$l_\tau$ is allowed in view of (13):

$$A(l_\tau) = \frac{1}{N^{1/2}} \sum_{j=0}^{N-1} s_1^*(j) s_2(j + l_\tau) \quad (14)$$

Equation 14 shows Equation (1) has been re-implemented digitally in terms of a normalising factor N. As described earlier, the DTO is now determined by the processing computer 150 as being the time offset number $l_\tau$ that maximises the magnitude of $A(l_\tau)$. The computer 150 has a finite time resolution, ie it applies the time offset $\tau$ in $l_\tau$ finite steps $\Delta t$. The offset that maximises the magnitude of $A(l_\tau)$ generally lies between two discrete time offsets. The computer 150 determines the three time offsets $l_\tau$ which correspond to the three largest consecutive values of $A(l_\tau)$, converts the values to a logarithmic scale, and then performs a parabolic interpolation of the logarithmic values to find an estimated peak value. The time offset where the peak value occurs is the required DTO value.

The procedure to determine DTO is summarised as follows:

(a) find an approximate DFO by using a series of trial frequency offsets and evaluating $A(l_\tau)$ for a range of values of $l_\tau$ for each of them; this is continued until a significant maximum in the magnitude of $A(l_\tau)$ is obtained indicating that the relevant trial frequency offset is the required DFO;

(b) frequency shift $s_2$ relative to $s_1$ by the approximate DFO;

(c) transform both $s_1$ and $s_2$ to their frequency domain equivalents $S_1$ and $S_2$;

(d) excise any unwanted frequency components;

(e) multiply each frequency component of $S_2$ by the complex conjugate of the same frequency component of $S_1$;

(f) transform the frequency component product back to the time domain.

(g) interpolate between the three largest magnitude values of $A(l_\tau)$ (on a logarithmic scale) to determine the time offset that maximises $A(l_\tau)$.

Figure 6:
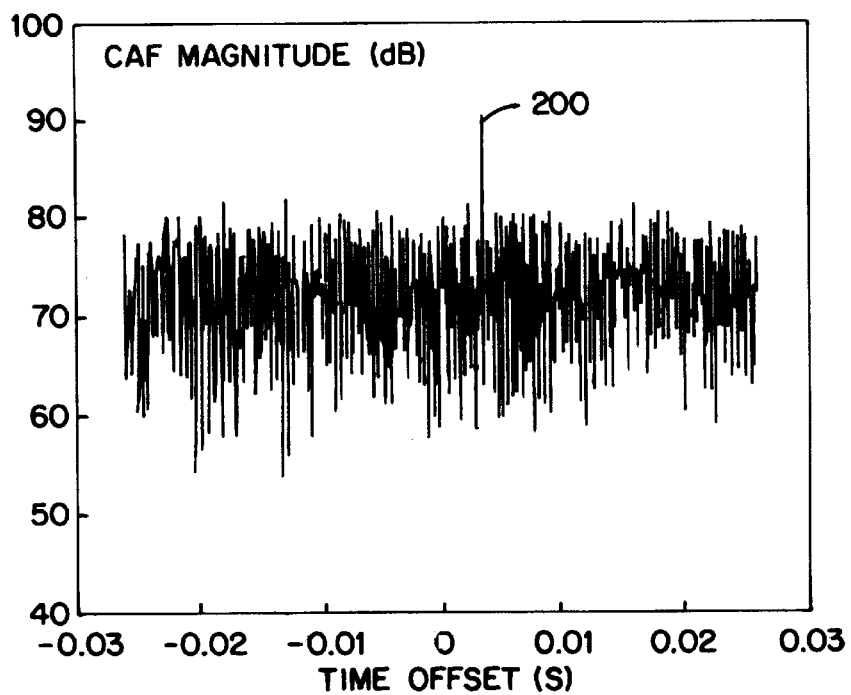
FIG. 6 is a graph of correlation against time offset for signals received from different satellite relays.
Figure 7:
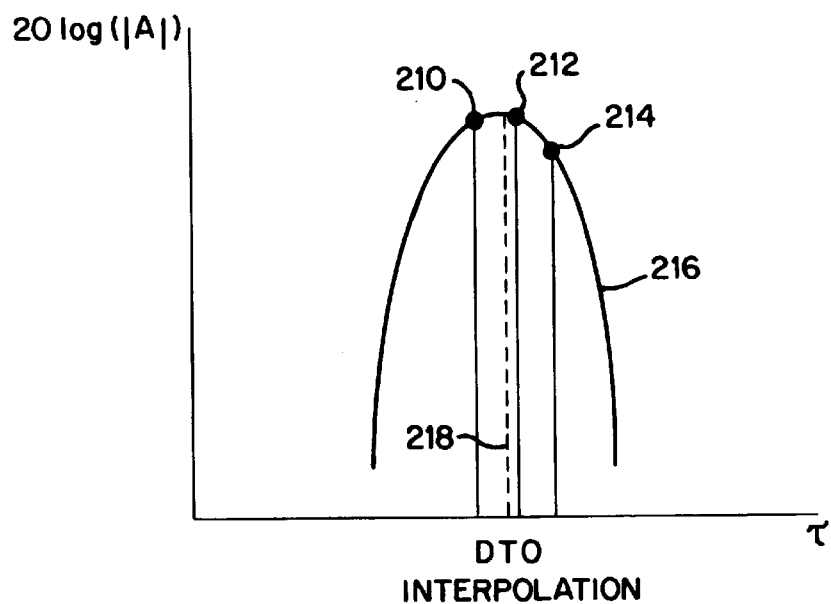
FIG. 7 illustrates interpolation to improve determination of differential time offset.

FIG. 6 is a graph of time domain correlation or $A(l_\tau)$ as a function of time offset for determining DTO. It shows a maximum 200 at about +0.003 sec. FIG. 7 illustrates interpolation of maximum values of $A(l_\tau)$ (expressed as 20 log|A|), which are plotted against applied time offset $\tau$. Three values of 20 log|A| are shown at 210, 212 and 214, together with a parabola 216 to which they are fitted. The peak value of 20 log|A| is indicated by a chain line 218, whose intercept on the $\tau$ axis gives the DTO.

In order to determine DFO more accurately, the product of $s_1^*$ and $s_2$ in the time domain is formed. Thus from Equations (5) and (6) with $s_2$ including a relative delay:

$$s_1^*(j)s_2(j) = \frac{1}{N}\sum_{k=0}^{N-1}\sum_{k'=0}^{N-1} S_1^*(k)S_2(k')e^{i2\pi j(k'-k)/N} \quad (15)$$

Fourier transforming Equation (15) gives $$A(l_v) = \frac{1}{N^{1/2}}\sum_{j=0}^{N-1} s_1^*(j)s_2(j)e^{-i2\pi j l_v/N} \quad (16)$$

$$A(l_v) = \frac{1}{N^{3/2}}\sum_{j=0}^{N-1}\sum_{k=0}^{N-1}\sum_{k'=0}^{N-1} S_1^*(k)S_2(k')e^{i2\pi j(k'-k-l_v)/N} \quad (17)$$

where $l_v$ denotes the discrete frequency offset number, ie) $v=l_v\Delta f$ Following (13):

$$A(l_v) = \frac{1}{N^{1/2}}\sum_{k=0}^{N-1} S_1^*(k)S_2(k+l_v) \quad (18)$$

Equation (18) denotes a frequency domain cross correlation. The DFO is determined by finding the frequency offset that maximises the magnitude of the correlation expressed as $A(l_v)$. As before, parabolic interpolation of the logarithms of the three largest correlations is employed to determine the peak correlation and the estimate of DFO.

The procedure to determine DFO is summarised as:

(a) frequency shift $s_2$ relative to $s_1$ by the coarse DFO;

(b) time shift $s_2$ relative to $s_1$ by the DTO;

(c) sample $s_1$ and the time shifted $s_2$ after filtering in a relatively narrow band;

(d) multiply each time component $s_2(j)$ by the complex conjugate of the same time component $s_1(j)$ to produce a respective time component product;

(e) Fourier transform the time component product to the frequency domain;

(f) interpolate between the three largest magnitude values of $A(l_v)$ to determine the DFO as being the frequency offset that maximises the correlation.

There is an error in interpolating between frequency slots because the correlation response in the frequency domain has sidelobes. Ideally the interpolation should use a sinx/x interpolation function to achieve the correct result on the linear signal magnitudes. Because simple parabolic interpolation is used on the logarithmic signal magnitudes, a degraded interpolation accuracy is achieved. To overcome this interpolation problem, time domain signals are windowed with a Hamming window before transforming to the frequency domain. This windowing function reduces the sidelobes in the correlation response to a negligible level thus enabling an accurate interpolation using the parabolic interpolation on the logarithm of the magnitude of the three largest components.

Figure 8:
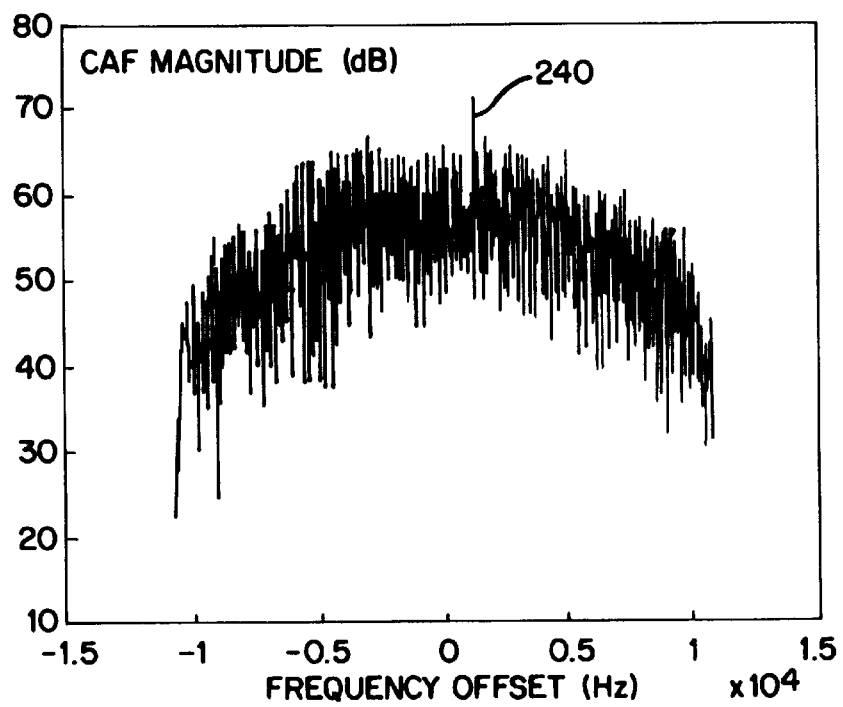
FIG. 8 is a graph of correlation against frequency offset for signals received from different satellite relays.

FIG. 8 is a graph of frequency domain correlation or $A(l_v)$ as a function of frequency offset $v$ for the determination of DFO. It shows a maximum 240 at at value of $v$ of about +80 Hz.

In practice there are limits to the accuracy of DFO measurement. These limits are set by the phase noise that is present on the turnround oscillators 60 on board the two satellites 14 and 16, the variation in the antenna-transmitter geometry and the phase noise on the ground station receivers 18A and 18B.

Figure 9:
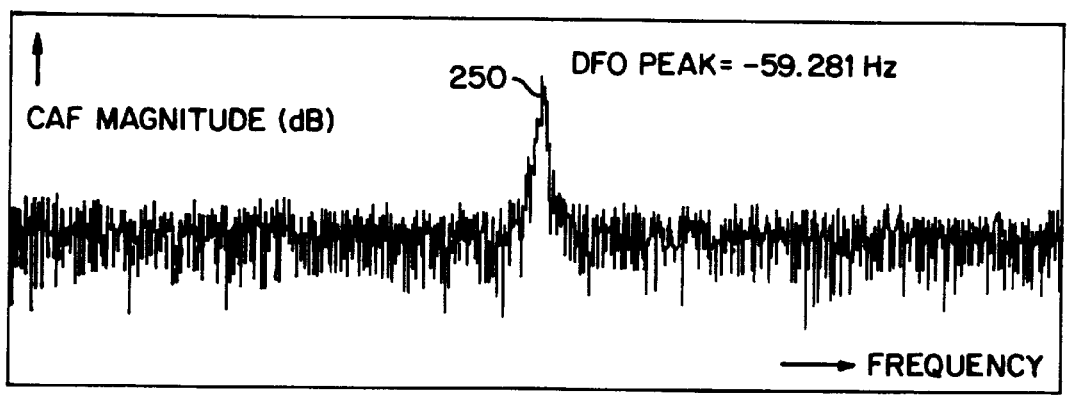
FIGS. 9 and 10 illustrate frequency domain correlation for unknown and reference transmitters.
Figure 10:
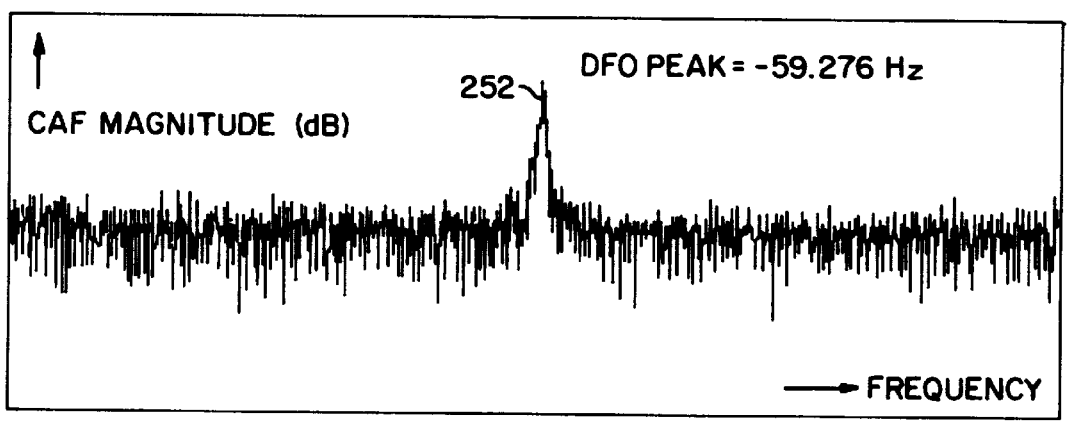
Figure 11:
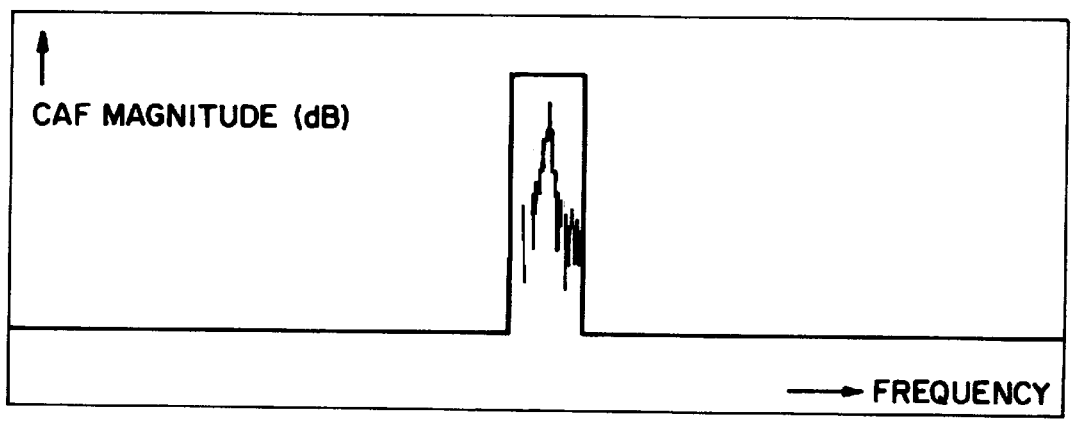
FIG. 11 illustrates excision of unwanted frequency components.

FIGS. 9 and 10 are graphs of CAFs against frequency (ie in the frequency domain) for an unknown transmitter 10 and a reference transmitter 22 respectively. These data have been obtained from actual signals and satellites. It can be seen that there is no single peak so that the peak interpolation technique described previously will not be effective. FIGS. 9 and 10 have similar structures with peaks 250 (59.281 Hz) and 252 (−59.276 Hz) respectively. The procedure to refine the correlations in FIGS. 9 and 10 is as follows. The CAF for the reference signal is excised to remove components away from the correlation peak as shown in FIG. 11. The purpose is to reduce noise on the inverse transformed signals.

After excision of unwanted components, the reference CAF is inverse Fourier transformed to the time domain. In order to obtain the DFO of the unknown transmitter 10 relative to that of the reference transmitter 22, their time domain waveforms are multiplied together. This involves each component of the time domain product typified by Equation (15) for the unknown signal being multiplied by the complex conjugate of the corresponding component of the filtered time domain product for the reference signal. The product of this multiplication is then transformed back to the frequency domain. The resulting relative CAF is shown in FIG. 12, in which correlation magnitude is plotted against frequency, and the CAF has a maximum 270 at −0.038 Hz.

Figure 12:
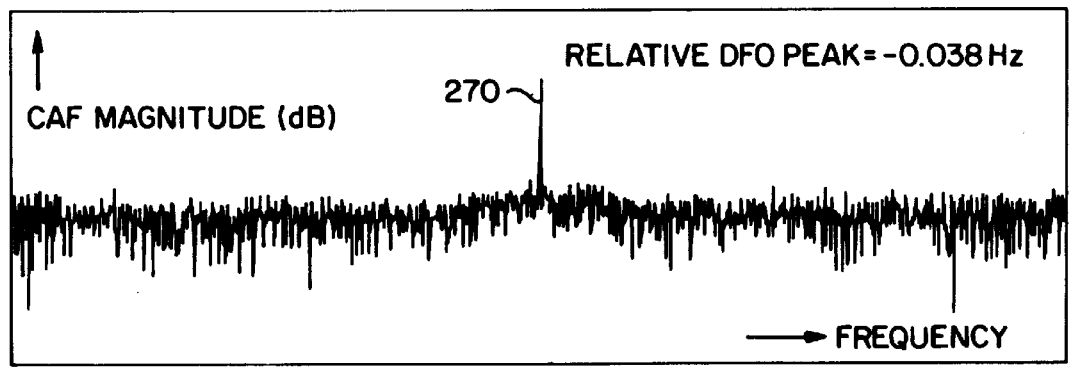
FIG. 12 is a graph illustrating correlation of cross ambiguity functions to determine relative DFO.

The degradation in the correlation spike in FIGS. 9 and 10 has been substantially removed in FIG. 12. This technique counteracts phase noise degradation in signals obtained via the receivers 18. It enables the invention to be employed in circumstances where there is significant phase noise degradation due to environmental, satellite turnround oscillator and receiver effects. This is because the phase noise on an unknown signal is correlated with that on the reference signal received at the same receiver 18, and is susceptible to reduction by appropriate processing. Furthermore, the invention is effective with geostationary satellites 14 and 16 having orbital inclination angles greater than 0.5 degrees relative to the Earth's equatorial plane. Such inclination angles give rise to significant variation in DFO with time.

The phase compensation technique will now be explained in more detail. Consider the signals $s_1(j)$ and $s_2(j)$ in the product on the left hand side of Equation (15). These signals have been frequency shifted by a coarse value of DFO and delayed by the precise value of DTO (either unknown or reference DFO depending on which signals are being processed). Because the DFO frequency shift is only a coarse approximation to an actual value of DFO the signals contain residual uncompensated frequency shifts. Furthermore the environment introduces phase perturbations on the signals. Finally the residual frequency shift is time dependent. Taking these factors into consideration the signals can be written:

$$s_1^U(t) = s^U(t)e^{i[2\pi v_1^U t + \phi_1^{U,M}(t)]}; \quad s_2^U(t) = s^U(t)e^{i[2\pi v_2^U t + \phi_2^{U,M}(t)]} \quad (19)$$

$$s_1^R(t) = s^R(t)e^{i[2\pi v_1^R t + \phi_1^{R,M}(t)]}; \quad s_2^R(t) = s^R(t)e^{i[2\pi v_2^R t + \phi_2^{R,M}(t)]}$$

where:
$s_1^U(t)$ is the unknown signal received via satellite along paths $1_1^u$ and $1_1^m$;
$s_2^U(t)$ is the unknown signal received via satellite along paths $1_2^u$ and $1_2^m$;
$s_1^R(t)$ is the reference signal received via satellite along paths $1_1^r$ and $1_1^m$;
$s_2^R(t)$ is the reference signal received via satellite along paths $1_2^r$ and $1_2^m$;
$v_1^U$ is the residual frequency shift on the unknown signal via paths $1_1^u$ and $1_1^m$;
$v_2^U$ is the residual frequency shift on the unknown signal via $1_2^u$ and $1_2^m$;
$v_1^R$ is the residual frequency shift on the reference signal via paths $1_1^r$ and $1_1^m$;
$v_2^R$ is the residual frequency shift on the reference signal via paths $1_2^r$ and $1_2^m$;
$\phi_1^{U,M}(t)$ is the residual phase perturbation on the unknown signal via paths $1_1^u$ and $1_1^m$;
$\phi_2^{U,M}(t)$ is the residual phase perturbation on the unknown signal via paths $1_2^u$ and $1_2^m$;
$\phi_1^{R,M}(t)$ is the residual phase perturbation on the reference signal via paths $1_1^r$ and $1_1^m$;
$\phi_2^{R,M}(t)$ is the residual phase perturbation on the reference signal via paths $1_2^r$ and $1_2^m$.

The phase perturbations break down into components as follows:

$$\phi_2^{U,M} = \phi_2^{M,a} + \phi_2^T + \phi_2^{U,a} + \phi_2^U + \phi^U \quad (20)$$
$$\phi_2^{R,M} = \phi_2^{M,a} + \phi_2^T + \phi_2^{R,a} + \phi_2^R + \phi^R$$
$$\phi_1^{U,M} = \phi_1^{M,a} + \phi_1^T + \phi_1^{U,a} + \phi_1^U + \phi^U$$
$$\phi_1^{R,M} = \phi_1^{M,a} + \phi_1^T + \phi_1^{R,a} + \phi_1^R + \phi^R$$

where;
$\phi_1^{M,a}$ is the perturbation due to the atmosphere between the first receiver 18A and the first satellite 14;
$\phi_2^{M,a}$ is the perturbation due to the atmosphere between the second receiver 18B and the second satellite 16;
$\phi_1^T$ is the perturbation due to the turnround oscillator on the first satellite 14;
$\phi_2^T$ is the perturbation due to the turnround oscillator the second satellite 16;
$\phi_1^{U,a}$ is the perturbation due to the atmosphere between the unknown transmitter 10 and the first satellite 14;
$\phi_2^{U,a}$ is the perturbation due to the atmosphere between the unknown transmitter 10 and the second satellite 16;
$\phi_1^{R,a}$ is the perturbation due to the atmosphere between the reference transmitter 22 and the first satellite 14;
$\phi_1^U$ is the perturbation in phase due to residual frequency change with time of the unknown signal propagated via the path $1_1^u$ from the unknown transmitter 10 to the first satellite 14,
$\phi_1^R$ is the perturbation in phase due to residual frequency change with time of the reference signal propagated via the path $1_1^r$ from the reference transmitter 22 to the first satellite 14;
$\phi_2^U$ is the perturbation in phase due to residual frequency change with time of the unknown signal propagated via the path $1_2^u$ from the unknown transmitter 10 the second satellite 16;
$\phi_2^R$ is the perturbation in phase due to residual frequency change with time of the reference signal propagated via the path $1_2^r$ from the reference transmitter 22 to the second satellite 16;
$\phi^U$ is the residual phase on the unknown signal; and
$\phi^R$ is the residual phase on the reference signal.

From Equations (19) we form the product:

$$(s_1^U)^* s_2^U s_1^R (s_2^R)^* = |s^U|^2 |s^R|^2 e^{i\phi} \quad (21)$$

where $$\phi = \{2\pi[(v_2^U - v_1^u) - (v_2^R - v_1^R)]t + (\phi_2^{U,M} - \phi_1^{U,M}) - (\phi_2^{R,M} - \phi_1^{R,M})\} \quad (22)$$

Finally from Equations (20):

$$\phi = \{2\pi[(v_2^U - v_1^U) - (v_2^R - v_1^R)]t + (\phi_2^U - \phi_1^U) - (\phi_2^R - \phi_1^R) + (\phi_2^{U,a} - \phi_1^{U,a}) - (\phi_2^{R,a} - \phi_1^{R,a})\} \quad (23)$$

It can be seen from Equation (23) that the residual phase component which remains after processing in accordance with Equation (21) is a combination of the residual DFO the unknown signals relative to that of the reference signals together with additional phase corrections. These phase corrections occur due to the change of DFO of with time and the differential effects of the atmosphere on the uplinks to the two satellites 14 and 16 from the unknown and reference transmitters 10 and 22. For a second satellite 16 three degrees away in its orbit from a first satellite 14 experiencing interference, atmospheric effects substantially cancel so that processing in accordance with Equation (21) yields the residual DFO of the unknown signals relative to that of the reference signals as illustrated in FIG. 12. Hence processing using reference signals in accordance with the invention compensates for phase noise and residual frequency drift. The former is particularly important at low values of satellite orbital inclination below 0.05 degrees, and the latter is particularly important at high values of satellite orbital inclination above 0.5 degrees.

This phase compensation technique is also applied to the determination of DTO for the unknown signal when the signal bandwidth is small (<100 kHz) and the processing gain is large (>60 dB). For large processing gains and narrow bandwidth signals, the duration of the waveform exceeds a few seconds, which is the typical coherence time of the satellite turnround oscillators, and consequently the correlation strength is degraded. Applying the phase compensation technique enables the full correlation strength to be achieved.

Determination of the location of the unknown transmitter will now be described in more detail. The first stage is to obtain a so-called global location solution. If the unknown and reference DTOs are DTO(unk) and DTO(ref) respectively, and treating the unknown and reference uplink path indicia $1_1^u$, $1_2^u$, $1_1^r$ and $1_2^r$ in FIG. 1 as vectors each representing the corresponding transmitter/satellite separation in magnitude and direction, then by geometry:

$$c[DTO(\text{unk}) - DTO(\text{ref})] = (l_2^u - l_1^u) - (l_2^r - l_1^r) = l_{21}(r) - l_{21}(r_0) \quad (24)$$

where $l_{21}(r)$ is the DSR from the unknown transmitter, $l_{21}(r_0)$ is the DSR from the reference transmitter and c is the velocity of light. Furthermore r and $r_0$ are the position vectors of the unknown transmitter 10 and the reference transmitter 22 from the centre of the Earth as origin in each case.

The Doppler frequency shift for a signal travelling on a path via a satellite is due to uplink DSRR at the uplink frequency and downlink DSRR at the downlink frequency.

The uplink and downlink frequencies differ because of the frequency shift introduced by the satellite turnround oscillator. Thus:

$$DFO(unk) = -\left\{v_{21}(r)\frac{f^u}{c} + [v_2(r_{m2}) - v_1(r_{m1})]\frac{(f^u - f^T)}{c}\right\} \quad (25)$$

$$DFO(ref) = -\left\{v_{21}(r_0)\frac{f^r}{c} + [v_2(r_{m2}) - v_1(r_{m1})]\frac{(f^r - f^T)}{c}\right\} \quad (26)$$

where $f^T$ is the satellite turnround oscillator frequency. Subtraction of (25) from (26), and multiplying both sides by $c/f^u$ gives:

$$\frac{-c}{f^u}[DFO(unk) - DFO(ref)] = \quad (27)$$

$$v_{21}(r) - v_{21}(r_0) + \left(1 - \frac{f^r}{f^u}\right)[v_{21}(r_0) + v_2(r_{m2}) - v_1(r_{m1})]$$

where:

$v_{21}(r)$ is the DSRR for the unknown transmitter 10;

$v_{21}(r_0)$ is the DSRR for the reference transmitter 22;

$v_1(r_{m1})$ is the Slant Range Rate (SRR) from the first satellite 14 to the first receiver 18A;

$v_2(r_{m2})$ is the SRR from the second satellite 16 to the second receiver 18B;

$f^r$ is the frequency of the reference signal as originally transmitted; and $f^u$ is the frequency of the unknown signal as originally transmitted.

If the receivers 18A and 18B are on the same site, the last two terms on the right hand side of Equation (27) become the DSRR of that site.

Equations (24) and (27) relate the measured values of DTO and DFO of an unknown transmitter relative to a reference transmitter to the DSR and DSRR of the unknown transmitter relative to the reference transmitter. The DTO and DFO are measurable as previously described and the DSR and DSRR are the geometrical values that can be used to locate the unknown transmitter.

The relationship between the DSR and positions is found approximately through a Taylor type expansion to relate the DSR at the unknown transmitter location to the DSR at the known transmitter location. A similar expansion is performed for DSRR.

Thus:

$$l_{21}(r) = l_{21}(r_0) + (r - r_0) \cdot \nabla l_{21}(r_0) + \text{higher order terms} \quad (28)$$

$$v_{21}(r) = v_{21}(r_0) + (r - r_0) \cdot \nabla v_{21}(r_0) + \text{higher order terms}. \quad (29)$$

where $\nabla$ is the vector gradient operator.

The vector gradient operator $\nabla$ operating on a scalar field defines the rate of change of that field. It is a vector pointing along the direction of maximum rate of change. Explicitly:

$$\nabla = e_x \frac{\partial}{\partial x} + e_y \frac{\partial}{\partial y} + e_z \frac{\partial}{\partial z}. \quad (30)$$

where $e_x$, $e_y$, & $e_z$, are unit vectors along x, y and z orthogonal axes.

Equations (24) and (28) can be combined and Equations (27) and (29) can be combined to yield the following two equations:

$$r \cdot \nabla l_{21}(r_0) = |r||\nabla l_{21}(r_0)|\cos(\gamma) = \Delta k_{21}{}^l(r;r_0) + r_0 \cdot \nabla l_{21}(r_0) \quad (31)$$

$$r \cdot \nabla v_{21}(r_0) = |r||\nabla v_{21}(r_0)|\cos(\delta) = \Delta k_{21}{}^v(r;r_0) + r_0 \cdot \nabla v_{21}(r_0) \quad (32)$$

where $$\Delta k_{21}^l(r, r_0) = c[DTO(unk) - DTO(ref)] = l_{21}(r) - l_{21}(r_0) \quad (33)$$

$$\Delta k_{21}^v(r, r_0) = \frac{-c}{f^u}[DFO(unk) - DFO(ref)] - \quad (34)$$

$$\left(1 - \frac{f^r}{f^u}\right)[v_{21}(r_0) + v_2(r_{m2}) - v_1(r_{m1})]$$

$$= v_{21}(r) - v_{21}(r_0)$$

Figure 13:
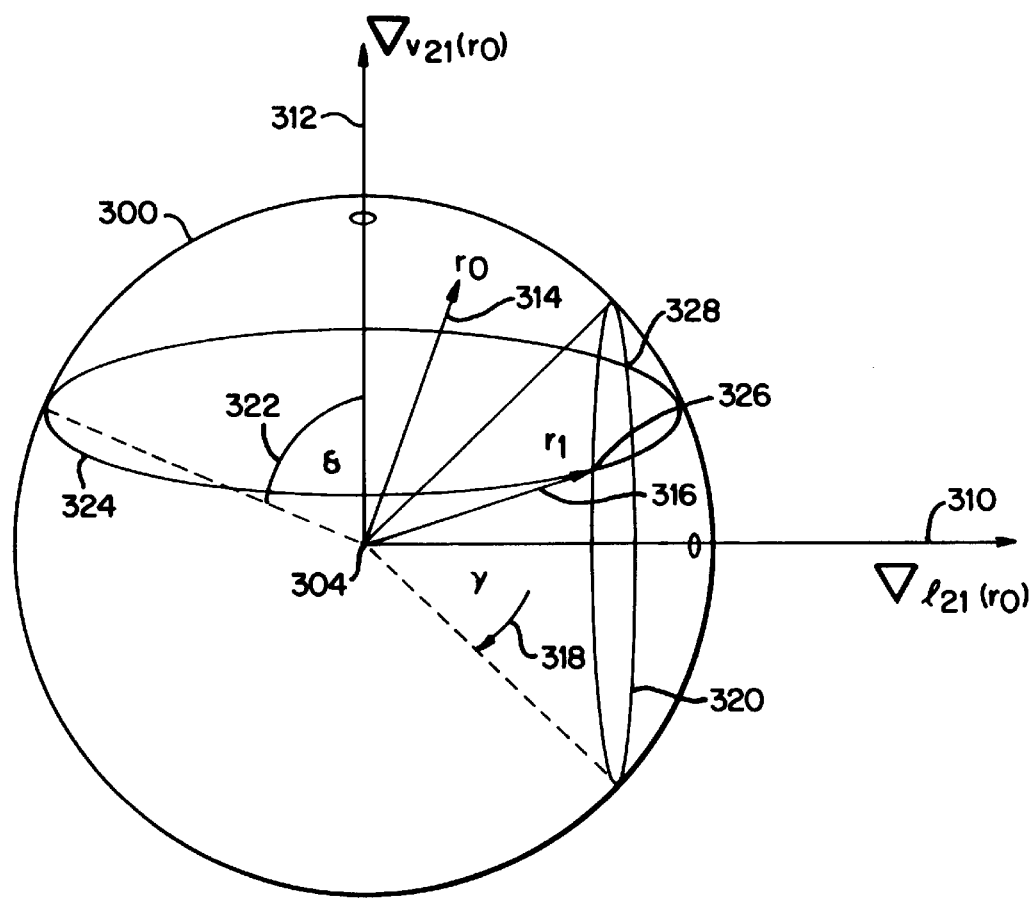
FIG. 13 is a schematic drawing illustrating the geometry of the global location procedure.

Referring now to FIG. 13, there is shown a geometrical representation of the determination of the location of the unknown transmitter, the Earth 300 and its centre 304 being illustrated. The vector gradient terms on the left hand side of Equations (32) and (31) corresponding to DSR and DSRR are shown as vectors 310 and 312 respectively. The reference transmitter site is shown by the vector $r_0$ at 314 and the unknown source is shown by the vector n at 316. A first semi-angle 318 is subtended at the centre 304 of the Earth by a first circle 320 on the surface of the Earth. A second semi-angle 322 is subtended at the centre 304 of the Earth by a circle 324 on the surface of the Earth. The unknown transmitter is located at the intersection of the circles 320 and 324.

In order to solve Equations (31) and (32) for r, the left and right hand sides are treated as being exactly equal and a first approximation $r_1$ is substituted for r on the left hand side. The right hand sides of Equations (31) and (32) are dependent on measured values of DTO and DFO, the positions and velocities of the satellites 14 and 16, the location of the reference transmitter 22 and the receivers 18A and 18B. The vector gradient terms on the left hand side of Equations (31) and (32) are dependent on the positions and velocities of the satellites 14 and 16 and the location of the reference transmitter 22. Therefore, all terms are known in Equations (31) and (32) except for the vector $r_1$ 316 substituted for r (which defines the first estimate of the location of the unknown transmitter). The right hand sides of Equations (31) and (32) are constant for given reference site 314 and satellite positions and velocities, and they constitute a statement that the vector dot product of the unknown source position vector 316 with the (respective) DSR and DSRR gradient vectors 310 and 312 is constant. If the Earth were to have been spherical, the unknown source position vector 316 would be of constant magnitude, and the locus of points of constant magnitude would be the circle 320 subtending a constant semi-angle 318 at the centre of the Earth.

Likewise the unknown signal source is constrained to trace out on the surface of the (spherical) Earth a second circle 324 which subtends a constant semi-angle 322 at the centre of the Earth 304. The circles 320 and 324 intersect at two positions 326 and 328. For favourable satellite geometry, one of these positions 326 is visible to both satellites 14 and 16, whereas the other 328 is not and is discounted. The former position visible to both satellites is the required location of the unknown source 10. These two location solutions can be determined by simple solution of a pair of simultaneous equations and does not need explicit determination of the two lines of position corresponding to the DSR and DSRR measurements.

To obtain further accuracy, the first determined solution $r_1$ is used as a new 'reference' location and Equations (31) and (32) are recast to give:

$$r_2 . \underline{\nabla} l_{21}(r_1) = \Delta k_{21}{}^l(r, r_1) + r_1 . \underline{\nabla} l_{21}(r_1) \qquad (35)$$

$$r_2 . \underline{\nabla} v_{21}(r_1) = \Delta k_{21}{}^v(r, r_1) + r_1 . \underline{\nabla} v_{21}(r_1) \qquad (36)$$

where:

$$\Delta k_{21}{}^l(r, r_1) = \Delta k_{21}{}^l(r, r_0) - [l_{21}(r_1) - l_{21}(r_0)] \qquad (37)$$

$$\Delta k_{21}{}^v(r, r_1) = \Delta k_{21}{}^v(r, r_0) - [v_{21}(r_1) - v_{21}(r_0)] \qquad (38)$$

It can be seen that $\Delta k_{21}{}^l(r, r_1)$ in Equation (37) is the difference between the measured uplink DSR and that calculated based on the determined position $r_1$. Likewise it can be seen that $\Delta k_{21}{}^v(r, r_1)$ in Equation (38) is the difference between the measured uplink DSRR and that calculated based on the determined position $r_1$.

The process of recalculating $r_j$ from $r_{j-1}$ is iterated until the difference $|r_j - r_{j-1}|$ is less than some predetermined amount (typically 50 km). The number of iterations required to achieve the 50 km convergence is typically three, but is dependent on the favourability of the satellite orbits.

Having converged on an initial (or global) location solution, the next stage is to produce a refined (or local) location solution. In this connection the global location solution is inaccurate because inter alia of the assumption of a spherical Earth. The local location solution takes into account small perturbations such as the true shape of the Earth and is consequently capable of more accuracy. Equations (24) and (27) relate the DSR and DSRR to the observed DTO and DFO. The initial (or global) location solution can be substituted into the fight hand sides of Equations (24) and (27) to achieve predictions of the values on the left hand sides of these equations. The differences between the observed and predicted DTO and DFO are used to derive error terms to relate to the errors in position. It can be shown by making a small incremental change dr to r in equations (31) and (32) that:

$$\underline{\nabla} l_{21} . dr = \Delta k_{21}{}^l(r, r_j) = dk_{21}{}^l, \qquad (39)$$

$$\underline{\nabla} v_{21} . dr = \Delta k_{21}{}^v(r, r_j) = dk_{21}{}^v, \qquad (40)$$

where the right hand sides of Equations (39) and (40) are the differences between observed and predicted DSR and DSRR relative to the reference value. The dr term on the left hand sides of Equations (37) and (38) is the residual error in the unknown transmitter location. Because of the constraint that the unknown transmitter must lie on the surface of the Earth, the dr term only has components dE and dN in the azimuth plane along the East and North directions respectively. Thus:

$$r = r_j + dr = r_j + dE \, e_E + dN \, e_N \qquad (41)$$

Equations (39) and (40) constitute a pair of simultaneous equations which can be written in terms of components using Equation (41) as:

$$\begin{bmatrix} dk_{21}^l \\ dk_{21}^v \end{bmatrix} = \begin{bmatrix} a_{11} & a_{12} \\ a_{21} & a_{22} \end{bmatrix} \begin{bmatrix} dE \\ dN \end{bmatrix} \qquad (42)$$

where
$a_{11} = \underline{\nabla} l_{21} . e_E$, $a_{12} = \underline{\nabla} l_{21} . e_N$, $a_{21} = \underline{\nabla} v_{21} . e_E$, $a_{22} = \underline{\nabla} v_{21} . e_N$, and $e_E$ and $e_N$ are unit vectors pointing locally East and North respectively at the point r.

From Equation (42), the dE and dN terms are estimated and are used to refine the estimate of the unknown transmitter location r. This provides a new position estimate r, and the local location solution can be iterated and the position estimate refined further until a convergent solution is obtained. Because the local location solution uses the exact form of equations, the solution obtained will be exact to the extent set by the measurement, propagation and ephemeris errors.

The previous description has concentrated on the determination of a location using a combination of a DSR and a DSRR measurement for the purposes of illustration. In this connection it is noted that Equations (24) and (27) relate DSR to DTO and DSRR to DFO. It is also possible to locate an unknown source using the following combinations of observations:

(a) DSR measurements obtained from a pair of satellites at different times when satellite positions have changed significantly;

(b) DSRR measurements obtained from a pair of satellites at different times when satellite positions have changed significantly;

(c) DSR measurements obtained from a first pair of satellites with DSR measurements obtained from a second pair of satellites, eg by using different pairings of three satellites either at similar times or at totally different times when satellite positions have changed significantly;

(d) DSRR measurements obtained from a pair of satellites with DSRR measurements obtained from a second pair of satellites eg by using different pairings of three satellites either at similar times or at totally different times when satellite positions have changed significantly;

(e) DSR measurements obtained from a pair of satellites with DSRR measurements obtained from the same pair of satellites but at different times when satellite positions have changed significantly;

(f) DSR measurements obtained from a pair of satellites with DSRR measurements obtained from a different pair of satellites either at similar times or at totally different times when satellite positions have changed significantly;

The combination of DFO and DTO measurements described with reference to FIGS. 1 to 13 is the most flexible option because it is normally applicable irrespective of satellite positions and pairings, which may remain unchanged or may be altered. It does not rely on different satellite pairings being available, nor on the unknown signal remaining detectable for a long enough time interval to enable two independent measurements to be made. Alternative options (a) to (f) above employ the same type of measurement more than once, additional location information being obtained by changing the relay satellite pairing or positions. The approach to analysis of data from options (a) to (f) is easily obtained from that described herein; the latter analysis provides equations based on DTO and DFO determination. All that is necessary for options (a) to (f) is to use twice those equations which relate to DTO or DFO (as the case may be). For example, in Equations (28) and (29), instead of expressions for $l_{21}(r)$ and $v_{21}(r)$, there would be two expressions for either $l_{21}(r)$ or $v_{21}(r)$ at respective times or for respective pairings.

Equations (42) can also be used to estimate location errors due to the effect of measurement and other errors. In this case the dk terms express the errors and the dr term is the location error. As measurement and other errors can often be described as random, a statistical approach is used and a root mean square position error derived.

Tables 1 and 2 show probable error levels in DTO and DFO measurements contributed by various error terms with and without the use of a reference signal in accordance with the invention.

TABLE 1

Effect of reference signal on DTO error

| Error term | Value without signal reference | Value with signal reference |
|---|---|---|
| Propagation | $5 \times 10^{-8}$ s/0.26 km | $2 \times 10^{-8}$ s/0.1 km |
| Satellite delay | $1 \times 10^{-8}$ s/0.05 km | 0 s/0 km |
| Satellite position | $2 \times 10^{-6}$ s/10.4 km | $1 \times 10^{-7}$ s/0.52 km |
| Time Difference between Receivers | $1 \times 10^{-7}$ s/0.52 km | $5 \times 10^{-9}$ s/0.026 km |

TABLE 2

Effect of reference signal on DFO error

| Error term | | Value without reference | Value with reference |
|---|---|---|---|
| Satellite oscillators | turnround | 10 Hz/11,700 km | 0 Hz/0 km |
| Satellite velocity | | 2 Hz/2340 km | $1.4 \times 10^{-2}$ Hz/16.4 km |
| Frequency between Receivers | Difference | 10 Hz/11,700 km | 0 Hz/0 km |

Table 1 shows that the dominant error in DTO after normalisation is the satellite position error, and Table 2 shows that the dominant error in DFO after normalisation is the satellite velocity error. These tables illustrate the very substantial improvements in error reduction obtainable by the use of a reference signal in accordance with the invention, ie better than one order of magnitude as regards satellite position error, and better than two orders of magnitude as regards satellite velocity error.

The results in Tables 1 and 2 have been obtained using typical values of position and velocity errors for satellites that are subject to routine stationkeeping of their geosynchronous orbit to maintain them within a longitude band of ±0.05 deg and a latitude band of ±0.05 deg. The two satellites were located at longitudes 7 deg East and 10 deg East and the 'unknown' signal was located at Paris, France (approximate longitude 2.5 deg E, latitude 50 deg N) and the reference signal transmitter and monitoring station were co-located at Defford, UK (lon 2.14 deg W, lat 52.1 deg N).

The advantages are obtainable in accordance with the invention will now be discussed.

The invention provides for acquisition and sampling of a signal from a reference transmitter of known location 22 simultaneously with, synchronously and with phase and frequency coherence to a signal of unknown location at separate receivers sites 32A and 32B and the subsequent processing of the signal samples at a single processing site 34. It enables reduction of effects from satellite and ground station local oscillator phase noise, frequency offset and drift with time thereby improving the accuracy of DFO measurement relative to that of the reference transmitter. This cancellation is especially important with narrowband signals (less than 100 kHz) for which long time samples (tens of seconds) are needed to realise detection of a very weak signal overspilt by the unknown transmitter into an adjacent satellite channel and subsequent, satisfactory measurement of DTO and relative DFO.

Improved relative DFO measurement accuracy enables DFOs to be measured to an accuracy of a few milliHertz compared to around 100 milliHertz possible previously due to the limitations of phase noise of satellite and ground station receiver oscillators.

Similarly relative DFO measurement enables frequency drift effects due to satellite motion of satellites in inclined geosynchronous orbits to be substantially cancelled. This effect can be seen from Table 3 where for a given bandwidth of unknown signal and subsequent integration time T a minimum resolution of a frequency slot for DFO processing Δf can be defined limited by this integration time. Over this integration time, the DFO of a signal has not to drift by a frequency slot. This, in turn, limits the maximum possible inclination angle of the geosynchronous satellite orbit to the equatorial plane. From these considerations, a maximum inclination for a raw DFO measurement can be defined. Likewise a maximum inclination for a DFO measurement relative to a reference transmitter can be defined. This latter inclination depends on the location of the reference transmitter relative to the unknown transmitter and for the purposes of Table 3 a reference transmitter 2 deg in latitude due South of an unknown transmitter at 52 deg latitude has been assumed.

TABLE 3

Maximum allowable inclination angle to raw and relative DFO measurements

| Signal BW (kHz) | T (s) | Δf (mHz) | max inclination angle for raw DFO (deg) | max inclination angle for relative DFO (deg) |
|---|---|---|---|---|
| 50 | 78 | 12.8 | 0.006 | 0.237 |
| 100 | 39 | 25.6 | 0.027 | 0.948 |
| 200 | 19.8 | 51.2 | 0.086 | 3.710 |
| 400 | 9.8 | 102.4 | 0.348 | 15.058 |

Table 3 illustrates that typical prior art systems are unable to work effectively with satellites with orbits having an inclination angle of more than 0.1 deg to the Earth's equator.

The example of the invention described with reference to FIGS. 1 to 13 employs a common timing, frequency and phase reference. This enables the unknown signal to be acquired at geographically separate sites that are not themselves coordinated to a common timing, frequency and phase reference, and degradation of subsequent DTO and relative DFO measurements is avoided. This enables receiving sites to be located within the downlink coverage areas of satellites 14 and 16 which need not cover common territory and therefore need not be monitorable at a single ground station site, unlike the prior art. The unknown signal must be receivable by both satellites 14 and 16 as does the reference signal, but this is not a serious limitation because there are many practical circumstances where this is the case. However, the prior art criterion of monitoring both satellites from a single ground station site is a serious limitation because satellite downlinks do not necessarily have common coverage areas.

The example of the invention described with reference to FIGS. 1 to 13 also enables reduction of effects due to satellite ephemeris errors. The impact on DFO and DTO of satellite ephemeris errors is to a large extent common between unknown and reference transmitters and therefore substantial cancellation is possible. For example, as shown in Tables 2 and 3, a pair of geosynchronous satellites located at longitude 7 deg E and 10 deg E, have typical stationkeeping errors that introduce errors of 2 Hz into a measurement of DFO and 2 μs into a measurement of DTO. This would introduce location errors of around 10 km in relation to DTO and 2340 km in relation to DFO. Use of a transmitter at a known location enable substantial correction of ephemeris errors. For example, for an 'unknown' transmitter located at Paris (lon 2.5 deg E, lat 50 deg N), the subtraction of DTO and DFO for a reference signal located 10 deg due West of the unknown site, reduces relative DTO error due to ephemeris errors to 0.29 μs and relative DFO error due to ephemeris errors to 35 mHz. This corresponds to a DTO location error of 1.5 km and DFO location error of 42 km.

The subtraction of DTO and DFO for a reference signal located 10 deg due South of the unknown site reduces relative DTO error due to ephemeris errors to 0.065 μs and relative DFO error due to ephemeris errors to 50 mHz. These errors correspond to location errors of 0.3 km and 60 km for DTO and DFO respectively.

If a reference transmitter is available closer to the unknown signal then the impact of ephemeris errors is reduced pro rata. Thus for a reference transmitter 1 deg West of the unknown location the DTO error due to ephemeris errors is 0.03 μs *corresponding to a location error of* 0.15 km and the DFO error due to ephemeris errors is 3.6 MHz corresponding to a location error of 4.3 km. ie 0.1 of the errors achieved with the reference signal 10 deg away in longitude.

Subsidiary advantages of the invention include the following:

(a) The use of a Taylor series expansion enables rapid convergence to the unknown source without the need for computation of Lines Of Position.

(b) The implementation of the CAF using digital signal processing techniques including time/frequency domain transformations enables unwanted signal components to be easily excised in either the frequency or time domain. If not excised, these unwanted components can cause significant degradation to the resultant CAF so that signals are not detected and/or DFO and DTO measurement accuracy is reduced.

Figure 14:
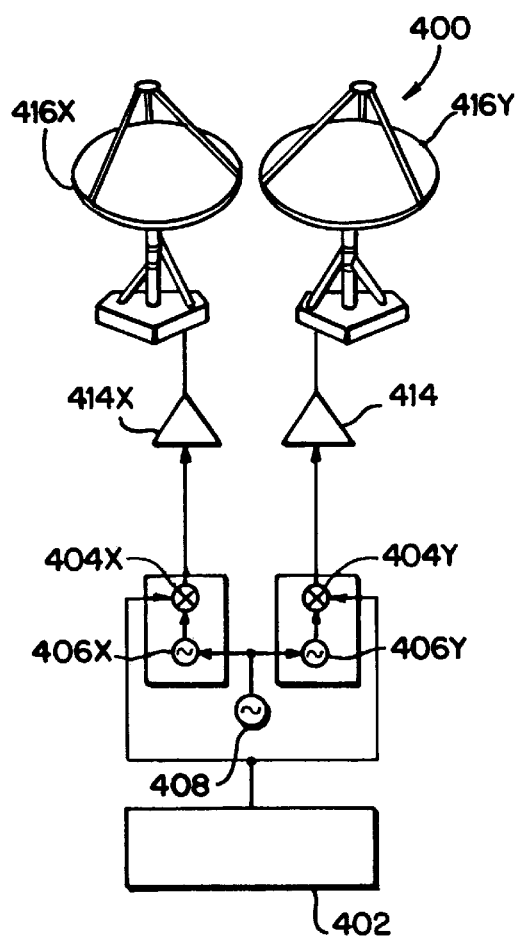
FIG. 14 is a schematic drawing of a reference transmitter designed to balance the levels of reference signals received by two relay satellites.

(c) The signal sampling and digital signal processing approach enables unambiguous reconstruction of a signal from the data that is used to provide the location thereby enabling proof that a particular signal is associated with a particular location. This is an improvement over the prior art where data are destroyed by processing and where other means are required to associate a signal with a particular determined location. Referring now to FIG. 14, there is shown a reference transmitter indicated generally by 400. The reference transmitter 400 incorporates a modulated waveform generator 402 providing a modulation signal to each of two mixers 404X and 404Y. These mixers receive local oscillator signals with nominally equal frequencies of 14.015 GHz from respective oscillators 406X and 406Y which are both phase locked to a signal from a reference oscillator 408. Output signals from the mixers 404X and 404Y pass to respective amplifiers 410X and 410Y, and thence to first and second transmit antennas 412X and 412Y respectively.

The reference transmitter 400 operates as follows. The mixers 404X and 404Y produce output signals consisting of modulated signal centred on 14.015 GHz both phase locked to the reference oscillator signal. The resulting signals are amplified at 410X and 410Y and then transmitted from respective antennas 412X and 412Y. The first antenna 412X has a main transmission lobe directed to the first satellite 14, and the second antenna 412Y has a main transmission lobe directed to the second satellite 16. The antenna transmission signals are set to amplitudes substantially lower than that of a typical communications signal, in order to avoid conflict with communications traffic using the satellites 14 and 16. However, the amplitudes are sufficiently high for detection at receivers 18A and 18B, and are higher than the amplitude of a communications transmitter sidelobe. They therefore provide improved signal to noise ration as compared to the sidelobe equivalent described earlier.

The advantages of this configuration are twofold. Firstly the frequency of the reference signal can be selected to occupy a frequency free of accesses in either satellite 14 or 16, for example at the edge of the transponder where the channel performance is unacceptable for normal communications signals and therefore would not normally be occupied. Secondly the level of the reference signal can be reduced to a low level in both satellite 14 and 16 channels so that the impact on satellite channel loading is negligible.

Figure 15:
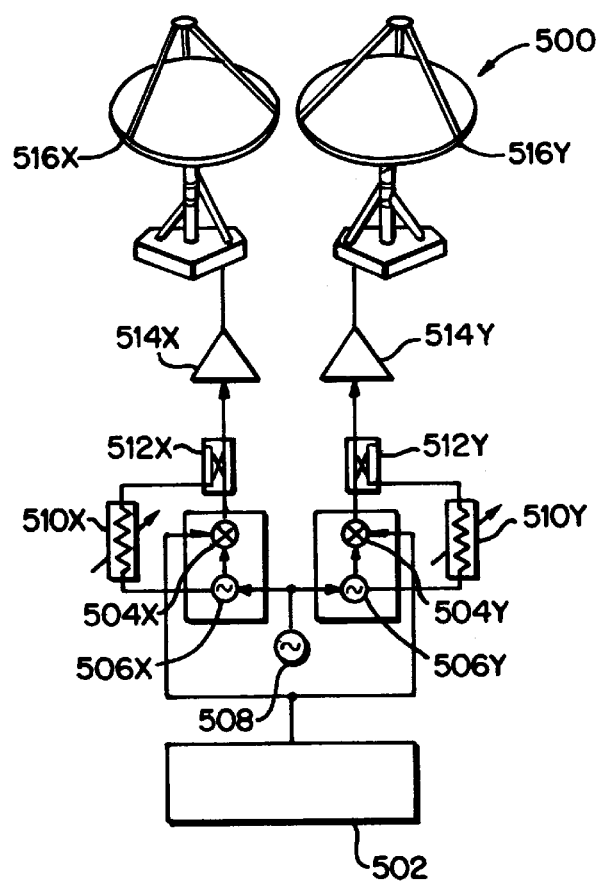
FIG. 15 is a schematic drawing of an alternative form of reference transmitter having waveform characteristics to facilitate DFO and DTO measurements.

Referring now to FIG. 15, there is shown a reference transmitter indicated generally by 500. The reference transmitter 500 incorporates a pseudo-random binary sequence (PRBS) generator 502 providing a modulation signal to each of two mixers 504X and 504Y. These mixers receive local oscillator signals with nominally equal frequencies of 14.015 GHz from respective oscillators 506X and 506Y which are both phase locked to a signal from a reference oscillator 508. They also provide carrier wave signals via variable attenuators 510X and 510Y to power combiners 512X and 512Y respectively, to which signals from the mixers 504X and 504Y are also fed. Output signals from the power combiners 512X and 512Y pass to respective amplifiers 514X and 514Y, and thence to first and second transmit antennas 516X and 516Y respectively.

The reference transmitter 500 operates as follows. The mixers 504X and 504Y produce output signals consisting of Pseudo-Random Binary Sequence (PRBS)-modulated 14.015 GHz carrier waves both phase locked to the reference oscillator signal. The mixer output signals receive additional carrier wave components at the power combiners 512X and 512Y, the components being adjusted to a convenient amplitude by means of the variable attenuators 510X and 510Y. The resulting combined signals are amplified at 514X and 514Y and then transmitted from respective antennas 516X and 516Y. The first antenna 516X has a main transmission lobe directed to the first satellite 14, and the second antenna 516Y has a main transmission lobe directed to the second satellite 16. The antenna transmission signals are set to amplitudes substantially lower than that of a typical communications signal, in order to avoid conflict with communications traffic using the satellites 14 and 16. However, the amplitudes are sufficiently high for detection at receivers 18A and 18B, and are higher than the amplitude of a communications transmitter sidelobe. They therefore provide improved signal to noise ratio as compared to the sidelobe equivalent described earlier.

The additional carrier wave component in each of the antenna transmission signals facilitates the determination of the DFO of the reference signal since it can be determined directly from the observation of the CW signal component received in receivers 18A and 18B. Furthermore, it facilitates the process of phase noise cancellation since the phase degradation can be directly observed on the CW signal received in each channel. This phase degradation can be subtracted from the received signal in each channel prior to CAF processing. The effect of the subsequent CAF processing is to derive DFO of the unknown signal relative to the reference signal since the received downlink reference signal contains the DFO shift of the reference signal.

The PRBS component of the signal provides a well-defined time domain CAF with a single peak at the reference DTO. This is an improvement over the use of an arbitrary reference waveform which may contain hidden periodicity and therefore produce more than one correlation peak in the time domain CAF causing confusion as to the true value of DTO.

In the foregoing example, measurement of the reference DTO and DFO was described for the purposes of determining the unknown DTO and DFO. It is not in fact essential to measure the reference DTO, although this leads to the greatest accuracy. It is possible and adequate for some purposes to measure the unknown DTO directly by CAF processing. Alternatively the reference DTO may be determined by geometry from the locations of the reference transmitter 22 and the relay satellites 14 and 16. However, for all practical purposes it is necessary to measure the reference DFO to determine the unknown DFO; this is because the required accuracy of DFO measurement is in the order of Hz×10$^{-3}$, and use of the measured reference DFO compensates for an error in this measurement in the order of several Hz introduced by the relay satellites 14 and 16.

I claim:

1. A method of locating the source of an unknown signal received by a plurality of signal relays, the method including the steps of:
   (a) arranging for a plurality of receivers to receive the unknown signal from respective signal relays;
   (b) arranging for the receivers to receive respective reference signals from respective signal relays, the reference signals either being replicas of a single signal or being replicas of signals locked in frequency, time and phase to a single signal and the reference signals being transmitted to the signal relays from reference transmitting means of known location;
   (c) separating the respective unknown signal and reference signal received by each receiver from one another and processing them coherently to preserve their timing and phase information relative to each other;
   (d) performing cross ambiguity function processing of the processed reference signals and the processed unknown signals and employing the processed reference signals to counteract phase noise and frequency drift effects in the unknown signals in order to determine at least one of the following:
      (i) values of the Differential Time Offset (DTO) and Differential Frequency Offset (DFO) of the unknown signals;
      (ii) values of the DTO of the unknown signals corresponding to different signal relay positions,
      (iii) values of the DFO of the unknown signals corresponding to different signal relay positions,
      (iv) values of the DTO of the unknown signals corresponding to different combinations of signal relays,
      (v) values of the DFO of the unknown signals corresponding to different combinations of signal relays.

2. A method according to claim 1 wherein processing in Step (c) is carried out in respect of signals received by each receiver by downconverting the unknown signal and the reference signal to intermediate frequency (IF) signals with predetermined bandwidths and obtaining digital samples thereof with sample timing and downconversion controlled in accordance with a precise frequency and timing standard.

3. A method according to claim 2 wherein the unknown and reference signals have IF bandwidths not greater than 4 MHz.

4. A method according to claim 3 wherein the DTO of the unknown signals is determined and the unknown signal has an IF bandwidth which is at least close to its bandwidth prior to downconversion.

5. A method according to claim 3 wherein the DFO of the unknown signals is determined and the unknown signal bandwidth is matched to the reference signal bandwidth.

6. A method according to claim 3 wherein the DFO of the unknown signals is determined and the unknown signal IF has a bandwidth of less than 100 kHz.

7. A method according to claim 6 wherein the unknown signal IF has a bandwidth substantially equal to 10 kHz.

8. A method according to claim 1 wherein cross ambiguity function processing in Step (d) includes the step of producing complex data from real data by a Hilbert transform procedure.

9. A method according to claim 1 wherein cross ambiguity function processing in Step (d) is performed to determine reference signal DTO.

10. A method according to claim 9 including the steps of:
   (a) finding a preliminary value of the reference signal DFO by evaluating the cross ambiguity function for a range of trial frequency offsets until a function maximum is obtained indicating that the relevant trial frequency offset is the required preliminary value;
   (b) transforming first and second reference signals associated with respective receivers to frequency domain equivalents thereof;
   (c) frequency shifting the first reference signal relative to the second reference signal in the frequency domain, the frequency shift consisting of the preliminary value of DFO;
   (d) excising any unwanted frequency components in the frequency domain reference signals;
   (e) in the frequency domain, multiplying the complex conjugate of each frequency component of the first reference signal by the corresponding frequency component of the second reference signal to produce frequency component products;
   (f) transforming the frequency component products to the time domain and producing a respective value of the cross ambiguity function for each of a range of values of relative time offset between the first and second reference signals;
   (g) selecting a set of the largest magnitude values of the cross ambiguity function, obtaining a maximum value of the magnitude of the cross ambiguity function by interpolation therebetween, and deriving the reference signal DTO as the relative time offset between the first and second reference signals which corresponds to that maximum value.

11. A method according to claim 1 wherein processing in Step (d) is carried out to obtain the reference signal DFO and includes the steps of:
   (a) determining the DTO between first and second reference signals associated with respective receivers;
   (b) introducing a relative time shift between the first and second reference signals equal to the reference signal DTO;
   (c) sampling the reference signals after the relative time shift;
   (d) multiplying the complex conjugate of each first reference signal sample by a corresponding sample of the second reference signal to produce time component products;
   (e) Fourier transforming the time component products to the frequency domain and producing a respective value of the cross ambiguity function for each of a range of values of relative frequency offset between the first and second reference signals;
   (f) selecting a set of the largest magnitude values of the cross ambiguity function, obtaining a maximum value of the cross ambiguity function by interpolation therebetween, and deriving the reference signal DFO as the relative frequency offset between the first and second reference signals which corresponds to that maximum value.

12. A method according to claim 1 wherein processing in Step (d) is carried out to obtain the unknown signal DTO and includes the steps of:
(a) introducing relative time and frequency shifts between first and second unknown signals associated with respective receivers, the time and frequency shifts being equal to the reference signal DTO and DFO respectively;
(b) sampling the unknown signals after the relative time and frequency shifts;
(c) transforming the first and second unknown signals to their frequency domain equivalents;
(d) applying a trial frequency offset to the transformed second unknown signal;
(e) excising any unwanted frequency components in the transformed unknown signals;
(f) multiplying the complex conjugate of each frequency component of the first unknown signal by the corresponding frequency component of the second unknown signal to produce frequency component products;
(g) transforming the frequency component products to the time domain to produce a respective value of the cross ambiguity function for each of a range of values of relative time offset between the first and second unknown signals;
(h) repeating steps (d) to (g) for a range of trial frequency offsets to obtain values of the cross ambiguity function;
(i) selecting a set of the largest magnitude values of the cross ambiguity function, obtaining a maximum value of the cross ambiguity function by interpolation therebetween, and deriving the unknown signal DTO as the relative time offset between the first and second unknown signals which corresponds to that maximum value.

13. A method according to claim 1 wherein processing in Step (d) is carried out to obtain the unknown signal DFO and includes a stage comprising processing reference signals and incorporating the steps of:
(a) introducing relative time and frequency shifts between first and second reference signals associated with respective receivers, the shifts being equal to the reference signal DTO and DFO respectively;
(b) sampling the reference signals after the relative time and frequency shifts;
(c) multiplying the complex conjugate of each first reference signal sample by the corresponding sample of the second reference signal to produce time component products;
(d) Fourier transforming the time component products to the frequency domain to produce a respective value of the cross ambiguity function for each of a range of values of relative frequency offset between the first and second reference signals;
(e) excising unwanted frequency domain components from the cross ambiguity function;
(f) Fourier transforming the excised cross ambiguity function back to the time domain to produce a set of filtered time domain products between the first and second reference signals containing phase noise perturbation information.

14. A method according to claim 1 wherein processing in Step (d) is carried out to obtain the unknown signal DFO and includes a further stage comprising processing the unknown signal and incorporating the steps of:
(a) introducing relative time and frequency shifts between first and second unknown signals equal to the reference signal DTO and DFO respectively;
(b) sampling the unknown signals after the relative time and frequency shifts;
(c) multiplying the complex conjugate of each first unknown signal sample by the corresponding sample of the second unknown signal to produce time component products;
(d) multiplying each time component product by the complex conjugate of the filtered time component product of the first and second reference signals;
(e) Fourier transforming the time component products to the frequency domain and producing a respective value of the cross ambiguity function for each of a range of values of relative frequency offset between the first and second unknown signals;
(f) selecting a set of the largest magnitude values of the cross ambiguity function, obtaining a maximum value of the cross ambiguity function by interpolation therebetween, and deriving the unknown signal DFO relative to the reference signal DFO as the relative frequency offset between the first and second unknown signals which corresponds to that maximum value.

15. A method according to claim 1 wherein calculating the position of the unknown transmitter in Step (e) is based on:
(a) obtaining from the unknown signal DTO and the reference signal DTO an expression involving the differential slant ranges (DSR) of the reference transmitter and the unknown transmitter, DSR in each case being the difference in length of the paths from the respective transmitter to the signal relays;
(b) obtaining from the unknown signal DFO and the reference signal DFO an expression involving the differential slant range rates (DSRR) of the reference transmitter and the unknown transmitter, DSRR in each case being the rate of change of the respective DSR; and
(c) performing a Taylor expansion analysis of the DSR and DSRR expressions to derive the location of the unknown transmitter from the unknown and reference DTOs and DFOs, the positions and velocities of the relays and the locations of the reference transmitter and the receivers.

16. A method according to claim 15 wherein the location derived in Step (c) of that claim is a first value thereof, and wherein one or more improved values thereof are derived by back substitution of the first value in the Taylor expansion analysis and iteration of the derivation of the location of the unknown transmitter.

17. A method according to claim 15 including refining the derivation of the location of the unknown transmitter by the steps of:
(a) producing calculated values of the unknown signal DTO and DFO from a derived value of the location of the unknown transmitter, the positions and velocities of the relays and the locations of the receivers;
(b) producing a correction for the derived location of the unknown transmitter from the differences between the calculated values of the unknown signal DTO and DFO and those measured with the aid of cross ambiguity processing.

18. A method according claim 1 wherein the processed reference signals and processed unknown signals are stored prior to cross ambiguity function processing.

19. Apparatus for locating the source of an unknown signal received by a plurality of signal relays, the apparatus including:
   (a) a plurality of receivers to receive the unknown signal and respective reference signals from respective signal relays, the reference signals either being replicas of a single signal or being replicas of signals locked in frequency, time and phase to a single signal and the reference signals being transmitted to the signal relays from reference transmitting means of known location;
   (b) a processing system for
      (i) separating the respective unknown signal and reference signal received by each receiver from one another and processing them coherently to preserve their timing and phase information relative to other;
      (ii) performing cross ambiguity function processing of the processed reference signals and the processed unknown signals and employing the reference signals to counteract phase noise and frequency drift effects in the unknown signals in order to determine at least one of the following:
         (1) values of the Differential Time Offset (DTO) and Differential Frequency Offset (DFO) of the unknown signals,
         (2) values of the DTO of the unknown signals corresponding to different signal relay positions,
         (3) values of the DFO of the unknown signals corresponding to different signal relay positions,
         (4) values of the DTO of the unknown signals corresponding to different combinations of signal relays, and
         (5) values of the DFO of the unknown signals corresponding to different combinations of signal relays, and
      (iii) calculating the position of the unknown signal source from the values of DTO and/or DFO as the case may be determined in cross ambiguity function processing.

20. Apparatus according to claim 19 arranged to offset received signals in time and/or frequency as appropriate in accordance with values obtained for DTO and/or DFO as the case may be and to obtain further values thereof from such offset signals.

21. Apparatus according to claim 19 including reference signal transmitting means arranged to transmit to the signal relays reference signals of substantially equal intensity.

22. Apparatus according to claim 19 including reference signal transmitting means arranged to transmit to the signal relays reference signals incorporating modulated and unmodulated carrier wave components.

23. Apparatus according to claim 19 or including means for storing the processed reference signals and processed unknown signals prior to cross ambiguity function processing.

24. Apparatus for locating the source of an unknown signal received by a plurality of orbiting satellite signal relays, the apparatus including:
   (a) a reference signal transmitter for transmitting a reference signal to the orbiting satellite signal relays from a known location, said reference signal either being a replica of a single signal or being a replica of signals locked in frequency, time and phase to a single signal;
   (b) a plurality of ground-based receivers to receive the unknown signal and respective reference signals from said orbiting satellite signal relays; and
   (c) a processing system comprising:
      (i) a plurality of acquisition systems, responsive to said ground-based receivers, separating the respective unknown signal and reference signal received by each receiver from one another and processing them coherently to preserve their timing and phase information relative to each other;
      (ii) a central control and processing computer, responsive to the processed unknown and reference signals from said acquisition systems, programmed to perform cross ambiguity function processing of the processed reference signals and the processed unknown signals and employing the reference signals to counteract phase noise and frequency drift effects in the unknown signals in order to determine at least one of the following:
         (1) values of the Differential Time Offset (DTO) and Differential Frequency Offset (DFO) of the unknown signals,
         (2) values of the DTO of the unknown signals corresponding to different signal relay positions,
         (3) values of the DFO of the unknown signals corresponding to different signal relay positions,
         (4) values of the DTO of the unknown signals corresponding to different combinations of signal relays, and
         (5) values of the DFO of the unknown signals corresponding to different combinations of signal relays, and
      (iii) calculating the position of the unknown signal source from the values of DTO and/or DFO as the case may be determined in cross ambiguity function processing.

25. Apparatus according to claim 24 wherein said acquisition systems are arranged to offset received signals in time and/or frequency as appropriate in accordance with values obtained for DTO and/or DFO as the case may be and to obtain further values thereof from such offset signals.

26. Apparatus according to claim 24 including reference signal transmitting means arranged to transmit to the signal relays reference signals of substantially equal intensity.

27. Apparatus according to claim 24 wherein said reference signal transmitter transmits signals incorporating modulated and unmodulated carrier wave components to the orbiting satellite signal relays reference.

28. Apparatus according to claim 24 including an archive store for storing the processed reference signals and processed unknown signals from said processing computer prior to supplying said stored processed reference signals and said stored processed unknown signals to said computer for cross ambiguity function processing.

* * * * *

UNITED STATES PATENT AND TRADEMARK OFFICE
CERTIFICATE OF CORRECTION

PATENT NO. : 6,018,312
DATED : January 25, 2000
INVENTOR(S) : Haworth

Page 1 of 1

It is certified that error appears in the above-identified patent and that said Letters Patent is hereby corrected as shown below:

<u>Column 29, after line 47,</u>
The following paragraph should be inserted into Claim 1, after paragraph (v):
-- (e) calculating the position of the unknown signal source from the values of DTO and/or DFO as the case may be determined in Step (d). --.

Signed and Sealed this

Thirty-first Day of July, 2001

*Attest:*

*Attesting Officer*

NICHOLAS P. GODICI
*Acting Director of the United States Patent and Trademark Office*